United States Patent
Zhang et al.

(10) Patent No.: US 12,423,874 B2
(45) Date of Patent: Sep. 23, 2025

(54) METHOD AND APPARATUS OF ADAPTIVE SAMPLING FOR MESH COMPRESSION BY ENCODERS

(71) Applicant: Tencent America LLC, Palo Alto, CA (US)

(72) Inventors: Xiang Zhang, Sunnyvale, CA (US); Shan Liu, San Jose, CA (US); Xiaozhong Xu, State College, PA (US); Chao Huang, Palo Alto, CA (US); Jun Tian, Belle Mead, NJ (US)

(73) Assignee: Tencent America LLC, Palo Alto, CA (US)

( * ) Notice: Subject to any disclaimer, the term of this patent is extended or adjusted under 35 U.S.C. 154(b) by 465 days.

(21) Appl. No.: 17/944,994

(22) Filed: Sep. 14, 2022

(65) Prior Publication Data

US 2023/0107834 A1    Apr. 6, 2023

Related U.S. Application Data

(60) Provisional application No. 63/252,063, filed on Oct. 4, 2021, provisional application No. 63/252,084, filed on Oct. 4, 2021.

(51) Int. Cl.
*G06T 9/00* (2006.01)
(52) U.S. Cl.
CPC .................................. *G06T 9/001* (2013.01)
(58) Field of Classification Search
CPC .............................. G06T 9/001; H04N 19/597
(Continued)

(56) References Cited

U.S. PATENT DOCUMENTS

2016/0261885 A1* 9/2016 Li ........................ H04N 19/132
2018/0189982 A1* 7/2018 Laroche .................... G06T 9/40
(Continued)

FOREIGN PATENT DOCUMENTS

CN    109478313 A    3/2019
CN    112218132 A    1/2021
(Continued)

OTHER PUBLICATIONS

Adaptive Mesh Texture for Multi-View Appearance Modeling, by Matthieu Armando, Jean-Sebastien Franco, Edmond Boyer, Pub: 2019 International Conference on 3D Vision (3DV) (2019, pp. 700-708), Sep. 1, 2019 (Year: 2019).*

(Continued)

*Primary Examiner* — Nay A Maung
*Assistant Examiner* — Heath E. Wells
(74) *Attorney, Agent, or Firm* — ArentFox Schiff LLP

(57) ABSTRACT

In some examples, an apparatus for mesh coding includes processing circuitry. The processing circuitry receives a data structure for a mesh frame with polygons representing a surface of an object. The data structure for the mesh frame includes a UV atlas that associates vertices of the mesh frame to UV coordinates in the UV atlas. The processing circuitry determines respective sampling rates for regions of the mesh frame according to respective characteristics of the regions of the mesh frame and applies, on the UV atlas, the respective sampling rates for the regions of the mesh frame to determine sampling positions on the UV atlas. The processing circuitry generates one or more sampled two dimensional (2D) maps for the mesh frame according to the sampling positions on the UV atlas, and encodes the one or more sampled 2D maps into a bitstream.

18 Claims, 16 Drawing Sheets

(58) Field of Classification Search
USPC .......................................................... 382/232
See application file for complete search history.

(56) References Cited

U.S. PATENT DOCUMENTS

| 2020/0221125 | A1  |   | 7/2020 | Budagavi et al. |           |
|--------------|-----|---|--------|-----------------|-----------|
| 2021/0090301 | A1  | * | 3/2021 | Mammou          | G06T 5/70 |
| 2021/0183011 | A1  | * | 6/2021 | Ricard          | G06T 3/06 |
| 2024/0022766 | A1  | * | 1/2024 | Ahn             | G06T 7/20 |
| 2024/0155157 | A1  | * | 5/2024 | Park            | H04N 19/184 |

FOREIGN PATENT DOCUMENTS

| EP | 3489900 A1 * | 5/2019 | ............. G06T 15/04 |
| WO | 2023023011 A1 | 2/2023 | |

OTHER PUBLICATIONS

Office Action received for Japanese Patent Application No. 2023-548180, mailed on Nov. 12, 2024, 9 pages (5 pages of English Translation and 4 pages of Original Document).

Extended European Search Report received for European Patent Application No. 22871094.3, mailed on Sep. 19, 2024, 8 pages.

Zhang et al., "[V-CG] Tencent's Dynamic Mesh Coding CfP Response", 138. MPEG Meeting, Apr. 25, 2022-Apr. 29, 2022, Motion Picture Expert Group or ISO/IEC JTC1/SC29/WG11, No. m59295, Mar. 25, 2022 (Mar. 25, 2022), XP030300732, 5 pages.

Office Action received for Chinese Patent Application No. 202280007284.X, mailed on May 1, 2024.

Extended European Search Report and Search Opinion received for European Application No. 22879379.0, mailed on Jan. 27, 2025, 9 pages.

Zhang et al., "[V-CG] Tencents Dynamic Mesh Coding CfP Response", 138. MPEG Meeting, Online, Motion Picture Expert Group or ISO/IEC JTC1/SC29/WG11, XP030301456, No. m59295, Apr. 25, 2022, 37 pages.

* cited by examiner

METHOD AND APPARATUS OF ADAPTIVE SAMPLING FOR MESH COMPRESSION BY ENCODERS

INCORPORATION BY REFERENCE

This present application claims the benefit of priority to U.S. Provisional Application No. 63/252,063, "Method and Apparatus of Adaptive Sampling for Mesh Compression by Encoders" filed on Oct. 4, 2021, and U.S. Provisional Application No. 63/252,084, "Method and Apparatus of Adaptive Sampling for Mesh Compression by Decoders" filed on Oct. 4, 2021. The entire disclosures of the prior applications are hereby incorporated by reference in their entirety.

TECHNICAL FIELD

The present disclosure describes embodiments generally related to mesh coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Various technologies are developed to capture and represent the world, such as objects in the world, environments in the world, and the like in 3-dimensional (3D) space. 3D representations of the world can enable more immersive forms of interaction and communication. In some examples, point clouds and meshes can be used as 3D representations of the world.

SUMMARY

Aspects of the disclosure provide methods and apparatuses for mesh coding (e.g., compression and decompression). In some examples, an apparatus for mesh encoding includes processing circuitry. The processing circuitry receives a data structure for a mesh frame with polygons representing a surface of an object. The data structure for the mesh frame includes a UV atlas that associates vertices of the mesh frame to UV coordinates in the UV atlas. The processing circuitry determines respective sampling rates for regions of the mesh frame according to respective characteristics of the regions of the mesh frame and applies, on the UV atlas, the respective sampling rates for the regions of the mesh frame to determine sampling positions on the UV atlas. The processing circuitry generates one or more sampled two dimensional (2D) maps for the mesh frame according to the sampling positions on the UV atlas, and encodes the one or more sampled 2D maps into a bitstream.

To determine the respective sampling rates for the regions of the mesh frame, in some examples, the processing circuitry determines a first sampling rate for a first region of the mesh frame according to a requirement that limits a first number of sampling positions in the first region. In an example, the processing circuitry determines the first sampling rate to achieve an oversampling ratio (OR) that is closest to a target value. The OR is a ratio between the first number of sampling positions to a number of vertices originally in the first region of the mesh frame. In another example, the processing circuitry adjusts the first sampling rate until an oversampling ratio (OR) is smaller than a first threshold. In another example, the processing circuitry adjusts the first sampling rate until an oversampling ratio (OR) is smaller than a first threshold and larger than a second threshold.

In some embodiments, a sampled 2D map of the one or more sampled 2D map includes sampled regions with sampled points corresponding to the sampling positions on the UV atlas. The processing circuitry determines that a sampling position is occupied in response to the sampling position being in a polygon; and determines an attribute of a sampled point in the sampled 2D map corresponding to the sampling position according to attributes of vertices of the polygon.

To forming the one or more sampled 2D maps, in some examples, the processing circuitry forms sampled regions corresponding to the regions of the mesh based on the respective sampling rates of the regions of the mesh, and places the sampling regions in a non-overlapping configuration to form a sampled map.

To place the sampling regions in the non-overlapping configuration, in some examples, after a subset of the sampled regions are placed in the non-overlapping configuration, the processing circuitry determines, for a current sampled region, an initial placement position according to a sampling rate of the current sampled region, and determines, whether the current sampled region at the initial placement position overlaps with the subset of the sampled regions. In an example, in response to the current sampled region at the initial placement position overlapping with the subset of the sampled regions, the processing circuitry determines an offset to the initial placement position, the offset allows the current sampled region to be non-overlapped with the subset of the sampled regions.

In some embodiments, the non-overlapping configuration comprises a minimum distance requirement between the sampled regions.

In an example, the processing circuitry encodes a value of a first sampling rate for a first region directly into the bitstream. In another example, the processing circuitry encodes a first index into the bitstream, the first index indicates a selection of the first sampling rate from a set of sampling rates. In another example, the processing circuitry encodes a syntax indicating a predictor for predicting the first sampling rate from a pre-established set of sampling rates. In another example, the processing circuitry encodes a syntax indicating a predictor for predicting the first sampling rate from a previously used sampling rate for an encoded region of the mesh frame. In another example, the processing circuitry encodes a syntax indicating a predictor for predicting the first sampling rate from a previously used sampling rate for an encoded region in another mesh frame encoded prior to the mesh frame.

In some embodiments, the processing circuitry makes a decision to signal a first sampling rate associated with a first region or to predict the first sampling rate and encodes a first syntax value indicating the decision.

In some examples, in response to the decision being signaling the first sampling rate, the processing circuitry can encode a value of the first sampling rate directly into the bitstream or can encode an index into the bitstream, the index indicates a selection of the first sampling rate from a set of sampling rates.

In some examples, in response to the decision being predicting the first sampling rate, the processing circuitry can encode a second syntax into the bitstream, the second syntax indicates a predictor to use for predicting the first sampling rate. Further, in an example, the processing circuitry encodes a prediction residual into the bitstream. The prediction residual is a difference between the first sampling rate and a sampling rate of the predictor.

In some examples, the processing circuitry encodes a base sampling rate into the bitstream.

In some examples, the processing circuitry encodes a control flag that indicates an enable/disable of an adaptive 2D atlas sampling is allowed.

In some examples, the processing circuitry determines, at least a first UV offset associated with a first region of the mesh frame. The first UV offset is applied to a first sampled region corresponding to the first region to avoid overlapping with other sampled regions. The processing circuitry encodes a syntax indicating the first UV offset into the bitstream. In an example, the processing circuitry encodes the syntax having a value of the first UV offset into the bitstream. In another example, the processing circuitry encodes the syntax indicating a predictor for predicting the first UV offset based on a pre-established set of UV offsets. In another example, the processing circuitry encodes the syntax indicating a predictor for predicting the first UV offset based on a previously used UV offset for an encoded region of the mesh frame. In another example, the processing circuitry encodes the syntax indicting a predictor for predicting the first UV offset based on a previously used UV offset for an encoded region in another mesh frame encoded prior to the mesh frame.

Aspects of the disclosure also provide a non-transitory computer-readable medium storing instructions which when executed by a computer cause the computer to perform any one or a combination of the methods for mesh coding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
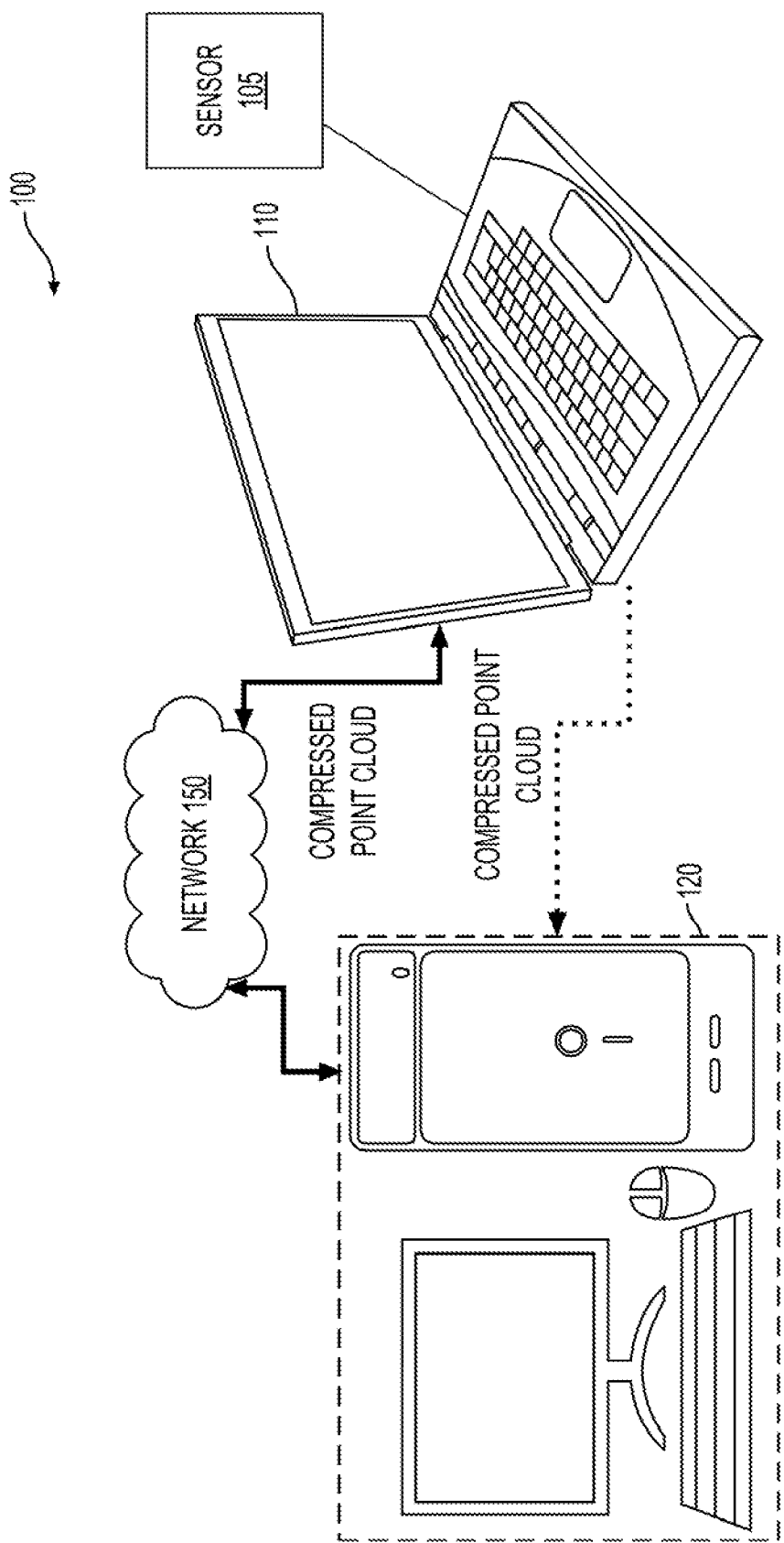
FIG. 1 shows a block diagram of a communication system in some examples.

Aspects of the disclosure provide techniques in the field of three dimensional (3D) media processing.

Technology developments in 3D media processing, such as advances in three dimensional (3D) capture, 3D modeling, and 3D rendering, and the like have promoted the ubiquitous presence of 3D media contents across several platforms and devices. In an example, a baby's first step can be captured in one continent, media technology can allow grandparents to view (and maybe interact) and enjoy an immersive experience with the baby in another continent. According to an aspect of the disclosure, in order to improve immersive experience, 3D models are becoming ever more sophisticated, and the creation and consumption of 3D models occupy a significant amount of data resources, such as data storage, data transmission resources.

According to some aspects of the disclosure, point clouds and meshes can be used as 3D models to represent immersive contents.

A point cloud generally may refer to a set of points in a 3D space, each with associated attributes, such as color, material properties, texture information, intensity attributes, reflectivity attributes, motion related attributes, modality attributes, and various other attributes. Point clouds can be used to reconstruct an object or a scene as a composition of such points.

A mesh (also referred to as mesh model) of an object can include polygons that describe the surface of the object. Each polygon can be defined by vertices of the polygon in 3D space and the information of how the vertices are connected into the polygon. The information of how the vertices are connected is referred to as connectivity information. In some examples, the mesh can also include attributes, such as color, normal, and the like, associated with the vertices.

According to some aspects of the disclosure, some coding tools for point cloud compression (PCC) can be used for mesh compression. For example, a mesh can be re-meshed to generate a new mesh that the connectivity information of the new mesh can be inferred. The vertices of the new mesh, and the attributes associated with the vertices of the new mesh can be considered as points in a point cloud and can be compressed using PCC codecs.

Point clouds can be used to reconstruct an object or a scene as a composition of points. The points can be captured using multiple cameras, depth sensors or Lidar in various setups and may be made up of thousands up to billions of points in order to realistically represent reconstructed scenes or objects. A patch generally may refer to a contiguous subset of the surface described by the point cloud. In an example, a patch includes points with surface normal vectors that deviate from one another less than a threshold amount.

PCC can be performed according to various schemes, such as a geometry-based scheme that is referred to as G-PCC, a video coding based scheme that is referred to as V-PCC, and the like. According to some aspects of the disclosure, the G-PCC encodes the 3D geometry directly and is a purely geometry-based approach without much to share with video coding, and the V-PCC is heavily based on video coding. For example, V-PCC can map a point of the 3D cloud to a pixel of a 2D grid (an image). The V-PCC scheme can utilize generic video codecs for point cloud compression. A PCC codec (encoder/decoder) in the present disclosure can be G-PCC codec (encoder/decoder) or V-PCC codec.

According to an aspect of the disclosure, the V-PCC scheme can use existing video codecs to compress the geometry, occupancy, and texture of a point cloud as three separate video sequences. The extra metadata needed to interpret the three video sequences is compressed separately. A small portion of the overall bitstream is the metadata, which could be encoded/decoded efficiently using software implementation in an example. The bulk of the information is handled by the video codec.

FIG. 1 illustrates a block diagram of a communication system (100) in some examples. The communication system (100) includes a plurality of terminal devices that can communicate with each other, via, for example, a network (150). For example, the communication system (100) includes a pair of terminal devices (110) and (120) interconnected via the network (150). In the FIG. 1 example, the first pair of terminal devices (110) and (120) may perform unidirectional transmission of point cloud data. For example, the terminal device (110) may compress a point cloud (e.g., points representing a structure) that is captured by a sensor (105) connected with the terminal device (110). The compressed point cloud can be transmitted, for example in the form of a bitstream, to the other terminal device (120) via the network (150). The terminal device (120) may receive the compressed point cloud from the network (150), decompress the bitstream to reconstruct the point cloud, and suitably display the reconstructed point cloud. Unidirectional data transmission may be common in media serving applications and the like.

In the FIG. 1 example, the terminal devices (110) and (120) may be illustrated as servers, and personal computers, but the principles of the present disclosure may be not so limited. Embodiments of the present disclosure find application with laptop computers, tablet computers, smart phones, gaming terminals, media players, and/or dedicated three-dimensional (3D) equipment. The network (150) represents any number of networks that transmit compressed point cloud between the terminal devices (110) and (120). The network (150) can include for example wireline (wired) and/or wireless communication networks. The network (150) may exchange data in circuit-switched and/or packet-switched channels. Representative networks include telecommunications networks, local area networks, wide area networks, the Internet, and the like.

Figure 2:
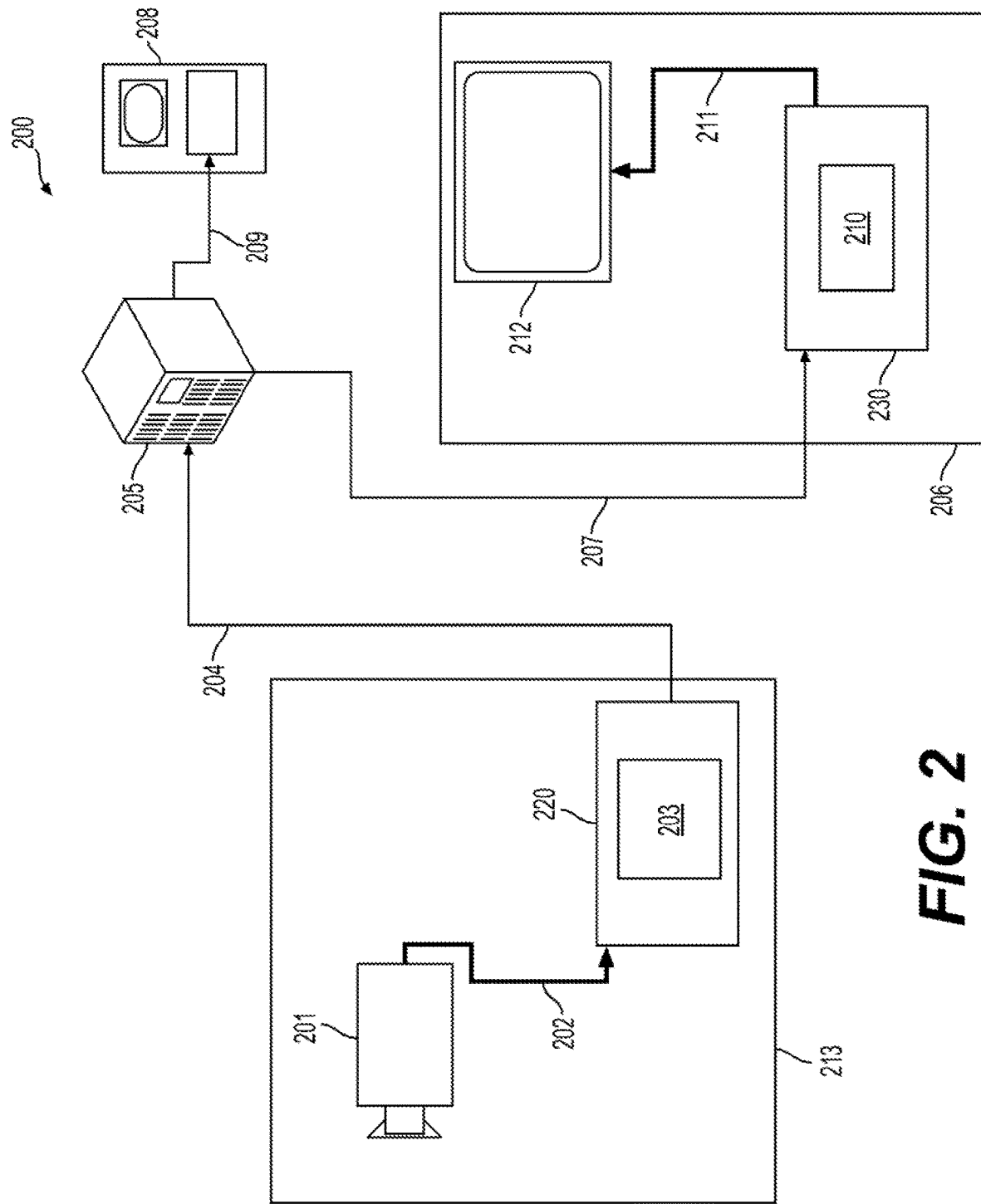
FIG. 2 shows a block diagram of a streaming system in some examples.

FIG. 2 illustrates a block diagram of a streaming system (200) in some examples. The streaming system (200) is a use application of point cloud. The disclosed subject matter can be equally applicable to other point cloud enabled applications, such as, 3D telepresence application, virtual reality application, and the like.

The streaming system (200) may include a capture subsystem (213). The capture subsystem (213) can include a point cloud source (201), for example light detection and ranging (LIDAR) systems, 3D cameras, 3D scanners, a graphics generation component that generates the uncompressed point cloud in software, and the like that generates for example point clouds (202) that are uncompressed. In an example, the point clouds (202) include points that are captured by the 3D cameras. The point clouds (202), depicted as a bold line to emphasize a high data volume when compared to compressed point clouds (204) (a bitstream of compressed point clouds). The compressed point clouds (204) can be generated by an electronic device (220) that includes an encoder (203) coupled to the point cloud source (201). The encoder (203) can include hardware, software, or a combination thereof to enable or implement aspects of the disclosed subject matter as described in more detail below. The compressed point clouds (204) (or bitstream of compressed point clouds (204)), depicted as a thin line to emphasize the lower data volume when compared to the stream of point clouds (202), can be stored on a streaming server (205) for future use. One or more streaming client subsystems, such as client subsystems (206) and (208) in FIG. 2 can access the streaming server (205) to retrieve copies (207) and (209) of the compressed point cloud (204). A client subsystem (206) can include a decoder (210), for example, in an electronic device (230). The decoder (210) decodes the incoming copy (207) of the compressed point clouds and creates an outgoing stream of reconstructed point clouds (211) that can be rendered on a rendering device (212).

It is noted that the electronic devices (220) and (230) can include other components (not shown). For example, the electronic device (220) can include a decoder (not shown) and the electronic device (230) can include an encoder (not shown) as well.

In some streaming systems, the compressed point clouds (204), (207), and (209) (e.g., bitstreams of compressed point clouds) can be compressed according to certain standards. In some examples, video coding standards are used in the compression of point clouds. Examples of those standards include, High Efficiency Video Coding (HEVC), Versatile Video Coding (VVC), and the like.

Figure 3:
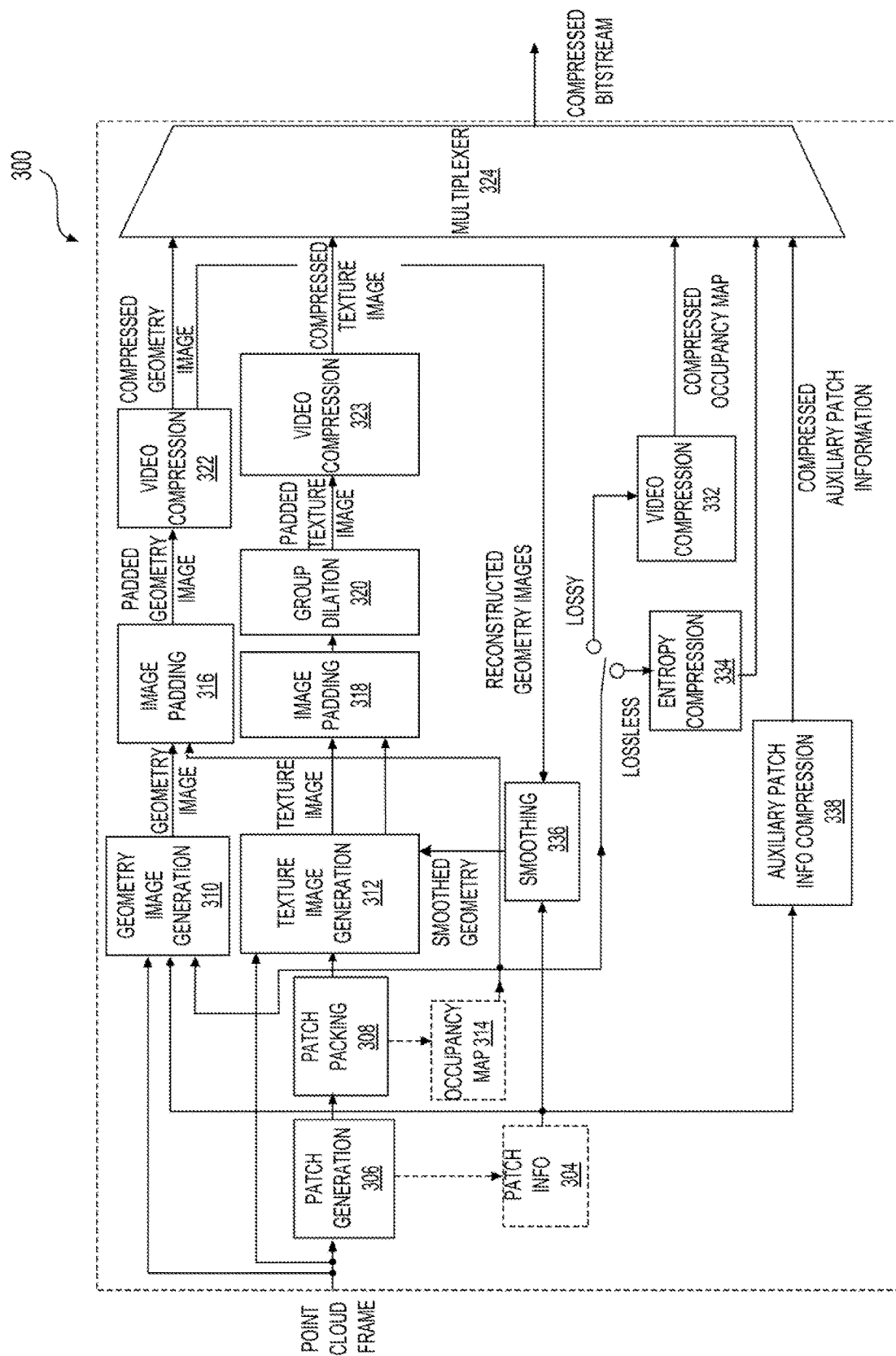
FIG. 3 shows a block diagram of an encoder for encoding point cloud frames in some examples.

FIG. 3 shows a block diagram of a V-PCC encoder (300) for encoding point cloud frames, according to some embodiments. In some embodiments, the V-PCC encoder (300) can be used in the communication system (100) and streaming system (200). For example, the encoder (203) can be configured and operate in a similar manner as the V-PCC encoder (300).

The V-PCC encoder (300) receives point cloud frames as uncompressed inputs and generates bitstream corresponding to compressed point cloud frames. In some embodiments, the V-PCC encoder (300) may receive the point cloud frames from a point cloud source, such as the point cloud source (201) and the like.

In the FIG. 3 example, the V-PCC encoder (300) includes a patch generation module (306), a patch packing module (308), a geometry image generation module (310), a texture image generation module (312), a patch info module (304), an occupancy map module (314), a smoothing module (336), image padding modules (316) and (318), a group dilation module (320), video compression modules (322), (323) and (332), an auxiliary patch info compression module (338), an entropy compression module (334), and a multiplexer (324).

According to an aspect of the disclosure, the V-PCC encoder (300), converts 3D point cloud frames into image-based representations along with some metadata (e.g., occupancy map and patch info) that is used to convert the compressed point cloud back into a decompressed point cloud. In some examples, the V-PCC encoder (300) can convert 3D point cloud frames into geometry images, texture images and occupancy maps, and then use video coding techniques to encode the geometry images, texture images and occupancy maps into a bitstream. Generally, a geometry image is a 2D image with pixels filled with geometry values associated with points projected to the pixels, and a pixel filled with a geometry value can be referred to as a geometry sample. A texture image is a 2D image with pixels filled with texture values associated with points projected to the pixels, and a pixel filled with a texture value can be referred to as a texture sample. An occupancy map is a 2D image with pixels filled with values that indicate occupied or unoccupied by patches.

The patch generation module (306) segments a point cloud into a set of patches (e.g., a patch is defined as a contiguous subset of the surface described by the point cloud), which may be overlapping or not, such that each patch may be described by a depth field with respect to a plane in 2D space. In some embodiments, the patch generation module (306) aims at decomposing the point cloud into a minimum number of patches with smooth boundaries, while also minimizing the reconstruction error.

In some examples, the patch info module (304) can collect the patch information that indicates sizes and shapes of the patches. In some examples, the patch information can be packed into an image frame and then encoded by the auxiliary patch info compression module (338) to generate the compressed auxiliary patch information.

In some examples, the patch packing module (308) is configured to map the extracted patches onto a 2 dimensional (2D) grid while minimize the unused space and guarantee that every M×M (e.g., 16×16) block of the grid is associated with a unique patch. Efficient patch packing can directly impact the compression efficiency either by minimizing the unused space or ensuring temporal consistency.

The geometry image generation module (310) can generate 2D geometry images associated with geometry of the point cloud at given patch locations. The texture image generation module (312) can generate 2D texture images associated with texture of the point cloud at given patch locations. The geometry image generation module (310) and the texture image generation module (312) exploit the 3D to 2D mapping computed during the packing process to store the geometry and texture of the point cloud as images. In order to better handle the case of multiple points being projected to the same sample, each patch is projected onto two images, referred to as layers. In an example, geometry image is represented by a monochromatic frame of W×H in YUV420-8 bit format. To generate the texture image, the texture generation procedure exploits the reconstructed/smoothed geometry in order to compute the colors to be associated with the re-sampled points.

The occupancy map module (314) can generate an occupancy map that describes padding information at each unit. For example, the occupancy image includes a binary map that indicates for each cell of the grid whether the cell belongs to the empty space or to the point cloud. In an example, the occupancy map uses binary information describing for each pixel whether the pixel is padded or not. In another example, the occupancy map uses binary information describing for each block of pixels whether the block of pixels is padded or not.

The occupancy map generated by the occupancy map module (314) can be compressed using lossless coding or lossy coding. When lossless coding is used, the entropy compression module (334) is used to compress the occupancy map. When lossy coding is used, the video compression module (332) is used to compress the occupancy map.

It is noted that the patch packing module (308) may leave some empty spaces between 2D patches packed in an image frame. The image padding modules (316) and (318) can fill the empty spaces (referred to as padding) in order to generate an image frame that may be suited for 2D video and image codecs. The image padding is also referred to as background filling which can fill the unused space with redundant information. In some examples, a good background filling minimally increases the bit rate while does not introduce significant coding distortion around the patch boundaries.

The video compression modules (322), (323), and (332) can encode the 2D images, such as the padded geometry images, padded texture images, and occupancy maps based on a suitable video coding standard, such as HEVC, VVC and the like. In an example, the video compression modules (322), (323), and (332) are individual components that operate separately. It is noted that the video compression modules (322), (323), and (332) can be implemented as a single component in another example.

In some examples, the smoothing module (336) is configured to generate a smoothed image of the reconstructed geometry image. The smoothed image can be provided to the texture image generation (312). Then, the texture image generation (312) may adjust the generation of the texture image based on the reconstructed geometry images. For example, when a patch shape (e.g. geometry) is slightly distorted during encoding and decoding, the distortion may be taken into account when generating the texture images to correct for the distortion in patch shape.

In some embodiments, the group dilation (320) is configured to pad pixels around the object boundaries with redundant low-frequency content in order to improve coding gain as well as visual quality of reconstructed point cloud.

The multiplexer (324) can multiplex the compressed geometry image, the compressed texture image, the compressed occupancy map, the compressed auxiliary patch information into a compressed bitstream.

Figure 4:
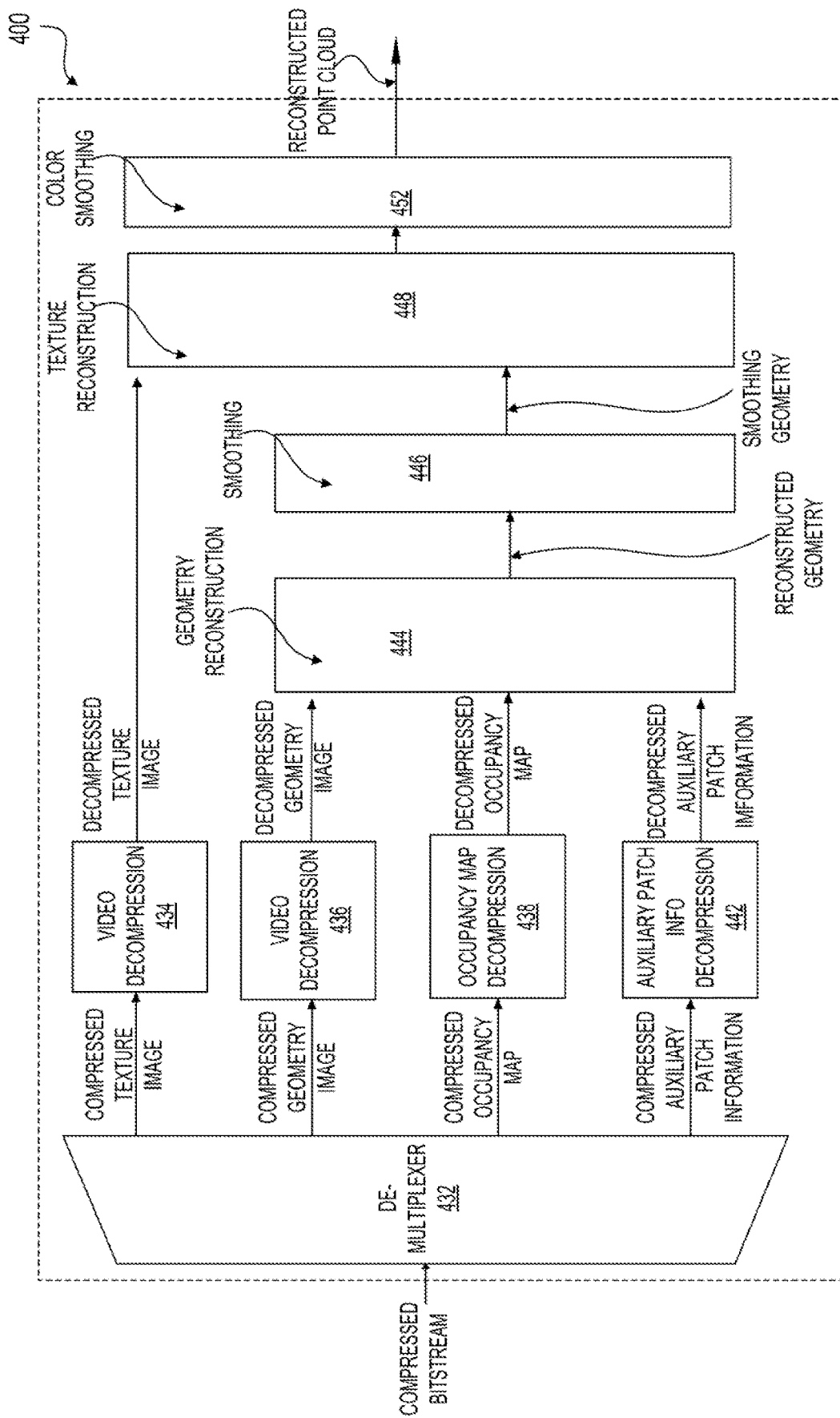
FIG. 4 shows a block diagram of a decoder for decoding a compressed bitstream corresponding to point cloud frames in some examples.

FIG. 4 shows a block diagram of a V-PCC decoder (400) for decoding compressed bitstream corresponding to point cloud frames, in some examples. In some examples, the V-PCC decoder (400) can be used in the communication system (100) and streaming system (200). For example, the decoder (210) can be configured to operate in a similar manner as the V-PCC decoder (400). The V-PCC decoder (400) receives the compressed bitstream, and generates reconstructed point cloud based on the compressed bitstream.

In the FIG. 4 example, the V-PCC decoder (400) includes a de-multiplexer (432), video decompression modules (434) and (436), an occupancy map decompression module (438), an auxiliary patch-information decompression module (442), a geometry reconstruction module (444), a smoothing module (446), a texture reconstruction module (448), and a color smoothing module (452).

The de-multiplexer (432) can receive and separate the compressed bitstream into compressed texture image, compressed geometry image, compressed occupancy map, and compressed auxiliary patch information.

The video decompression modules (434) and (436) can decode the compressed images according to a suitable standard (e.g., HEVC, VVC, etc.) and output decompressed images. For example, the video decompression module (434) decodes the compressed texture images and outputs decompressed texture images; and the video decompression module (436) decodes the compressed geometry images and outputs the decompressed geometry images.

The occupancy map decompression module (438) can decode the compressed occupancy maps according to a suitable standard (e.g., HEVC, VVC, etc.) and output decompressed occupancy maps.

The auxiliary patch-information decompression module (442) can decode the compressed auxiliary patch information according to a suitable standard (e.g., HEVC, VVC, etc.) and output decompressed auxiliary patch information.

The geometry reconstruction module (444) can receive the decompressed geometry images, and generate reconstructed point cloud geometry based on the decompressed occupancy map and decompressed auxiliary patch information.

The smoothing module (446) can smooth incongruences at edges of patches. The smoothing procedure aims at alleviating potential discontinuities that may arise at the patch boundaries due to compression artifacts. In some embodiments, a smoothing filter may be applied to the pixels located on the patch boundaries to alleviate the distortions that may be caused by the compression/decompression.

The texture reconstruction module (448) can determine texture information for points in the point cloud based on the decompressed texture images and the smoothing geometry.

The color smoothing module (452) can smooth incongruences of coloring. Non-neighboring patches in 3D space are often packed next to each other in 2D videos. In some examples, pixel values from non-neighboring patches might be mixed up by the block-based video codec. The goal of color smoothing is to reduce the visible artifacts that appear at patch boundaries.

Figure 5:
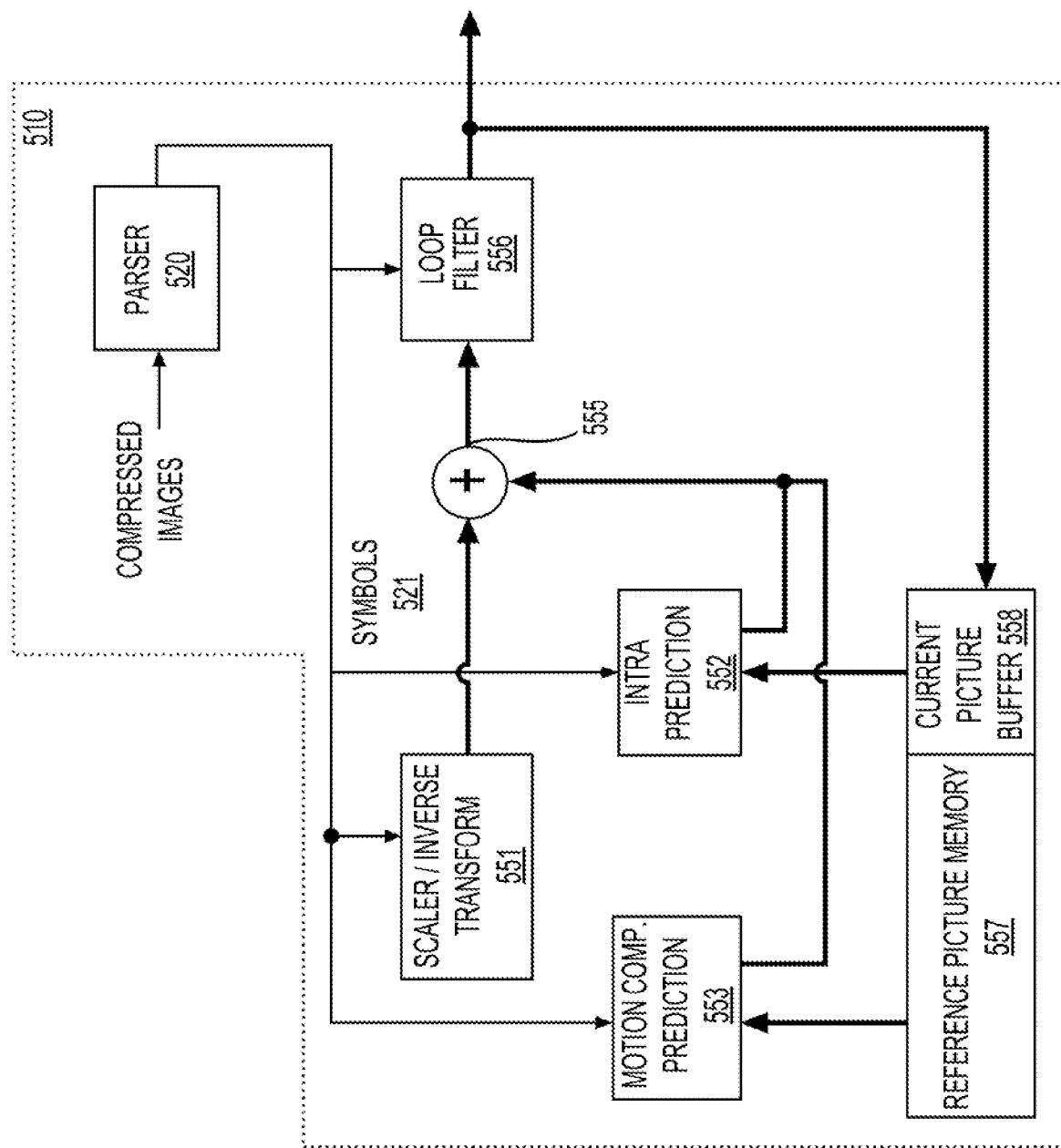
FIG. 5 shows a block diagram of a video decoder in some examples.

FIG. 5 shows a block diagram of a video decoder (510) in some examples. The video decoder (510) can be used in the V-PCC decoder (400). For example, the video decompression modules (434) and (436), the occupancy map decompression module (438) can be similarly configured as the video decoder (510).

The video decoder (510) may include a parser (520) to reconstruct symbols (521) from compressed images, such as the coded video sequence. Categories of those symbols include information used to manage operation of the video decoder (510). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from a buffer memory, so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to a render device as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

Figure 6:
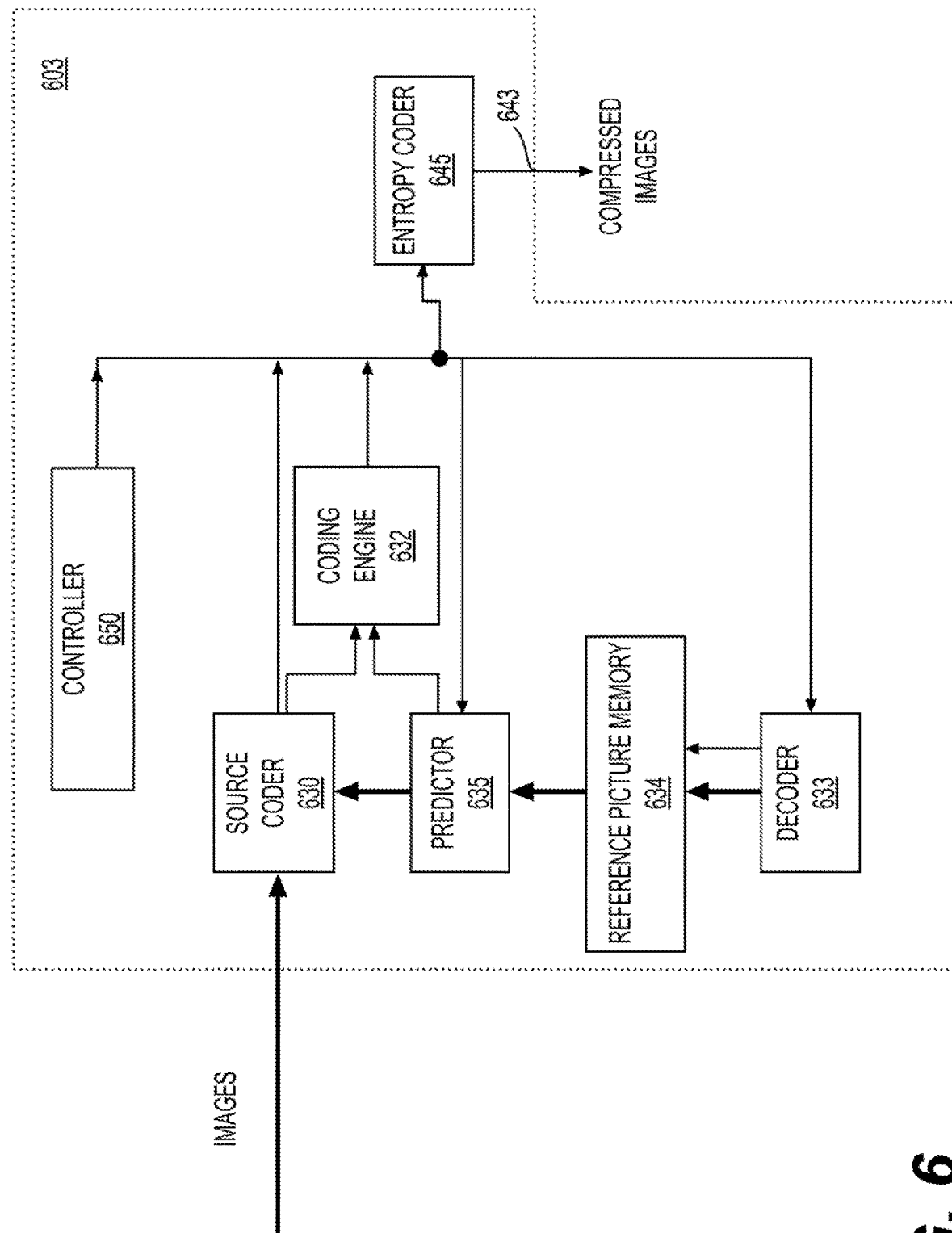
FIG. 6 shows a block diagram of a video encoder in some examples.

FIG. 6 shows a block diagram of a video encoder (603) according to an embodiment of the present disclosure. The video encoder (603) can be used in the V-PCC encoder (300) that compresses point clouds. In an example, the video compression module (322) and (323), and the video compression module (332) are configured similarly to the encoder (603).

The video encoder (603) may receive images, such as padded geometry images, padded texture images and the like, and generate compressed images.

According to an embodiment, the video encoder (603) may code and compress the pictures of the source video sequence (images) into a coded video sequence (compressed images) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including and parser (520) may not be fully implemented in the local decoder (633).

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by losslessly compressing the symbols according to technologies such as Huffman coding, variable length coding, arithmetic coding, and so forth.

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

A video may be in the form of a plurality of source pictures (images) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
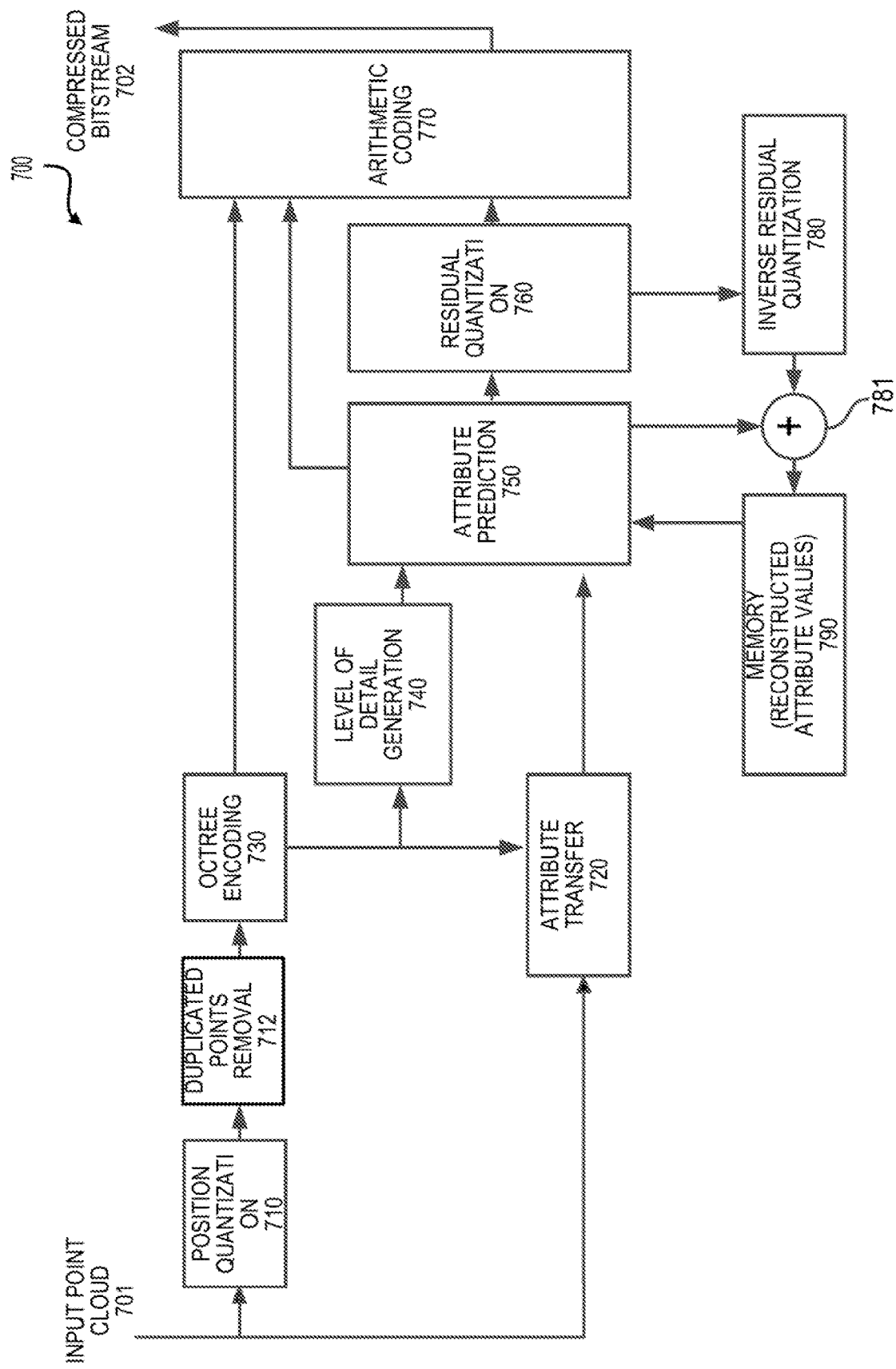
FIG. 7 shows a block diagram of an encoder for encoding point cloud frames in some examples.

FIG. 7 shows a block diagram of a G-PCC encoder (700) in some examples. The G-PCC encoder (700) can be configured to receive point cloud data and compress the point cloud data to generate a bit stream carrying compressed point cloud data. In an embodiment, the G-PCC encoder (700) can include a position quantization module (710), a duplicated points removal module (712), an octree encoding module (730), an attribute transfer module (720), a level of detail (LOD) generation module (740), an attribute prediction module (750), a residual quantization module (760), an arithmetic coding module (770), an inverse residual quantization module (780), an addition module (781), and a memory (790) to store reconstructed attribute values.

As shown, an input point cloud (701) can be received at the G-PCC encoder (700). Positions (e.g., 3D coordinates) of the point cloud (701) are provided to the quantization module (710). The quantization module (710) is configured to quantize the coordinates to generate quantized positions.

The duplicated points removal module (712) is configured to receive the quantized positions and perform a filter process to identify and remove duplicated points. The octree encoding module (730) is configured to receive filtered positions from the duplicated points removal module (712), and perform an octree-based encoding process to generate a sequence of occupancy codes that describe a 3D grid of voxels. The occupancy codes are provided to the arithmetic coding module (770).

The attribute transfer module (720) is configured to receive attributes of the input point cloud, and perform an attribute transfer process to determine an attribute value for each voxel when multiple attribute values are associated with the respective voxel. The attribute transfer process can be performed on the re-ordered points output from the octree encoding module (730). The attributes after the transfer operations are provided to the attribute prediction module (750). The LOD generation module (740) is configured to operate on the re-ordered points output from the octree encoding module (730), and re-organize the points into different LODs. LOD information is supplied to the attribute prediction module (750).

The attribute prediction module (750) processes the points according to an LOD-based order indicated by the LOD information from the LOD generation module (740). The attribute prediction module (750) generates an attribute prediction for a current point based on reconstructed attributes of a set of neighboring points of the current point stored in the memory (790). Prediction residuals can subsequently be obtained based on original attribute values received from the attribute transfer module (720) and locally generated attribute predictions. When candidate indices are used in the respective attribute prediction process, an index corresponding to a selected prediction candidate may be provided to the arithmetic coding module (770).

The residual quantization module (760) is configured to receive the prediction residuals from the attribute prediction module (750), and perform quantization to generate quantized residuals. The quantized residuals are provided to the arithmetic coding module (770).

The inverse residual quantization module (780) is configured to receive the quantized residuals from the residual quantization module (760), and generate reconstructed prediction residuals by performing an inverse of the quantization operations performed at the residual quantization module (760). The addition module (781) is configured to receive the reconstructed prediction residuals from the inverse residual quantization module (780), and the respective attribute predictions from the attribute prediction module (750). By combining the reconstructed prediction residuals and the attribute predictions, the reconstructed attribute values are generated and stored to the memory (790).

The arithmetic coding module (770) is configured to receive the occupancy codes, the candidate indices (if used), the quantized residuals (if generated), and other information, and perform entropy encoding to further compress the received values or information. As a result, a compressed bitstream (702) carrying the compressed information can be generated. The bitstream (702) may be transmitted, or otherwise provided, to a decoder that decodes the compressed bitstream, or may be stored in a storage device.

Figure 8:
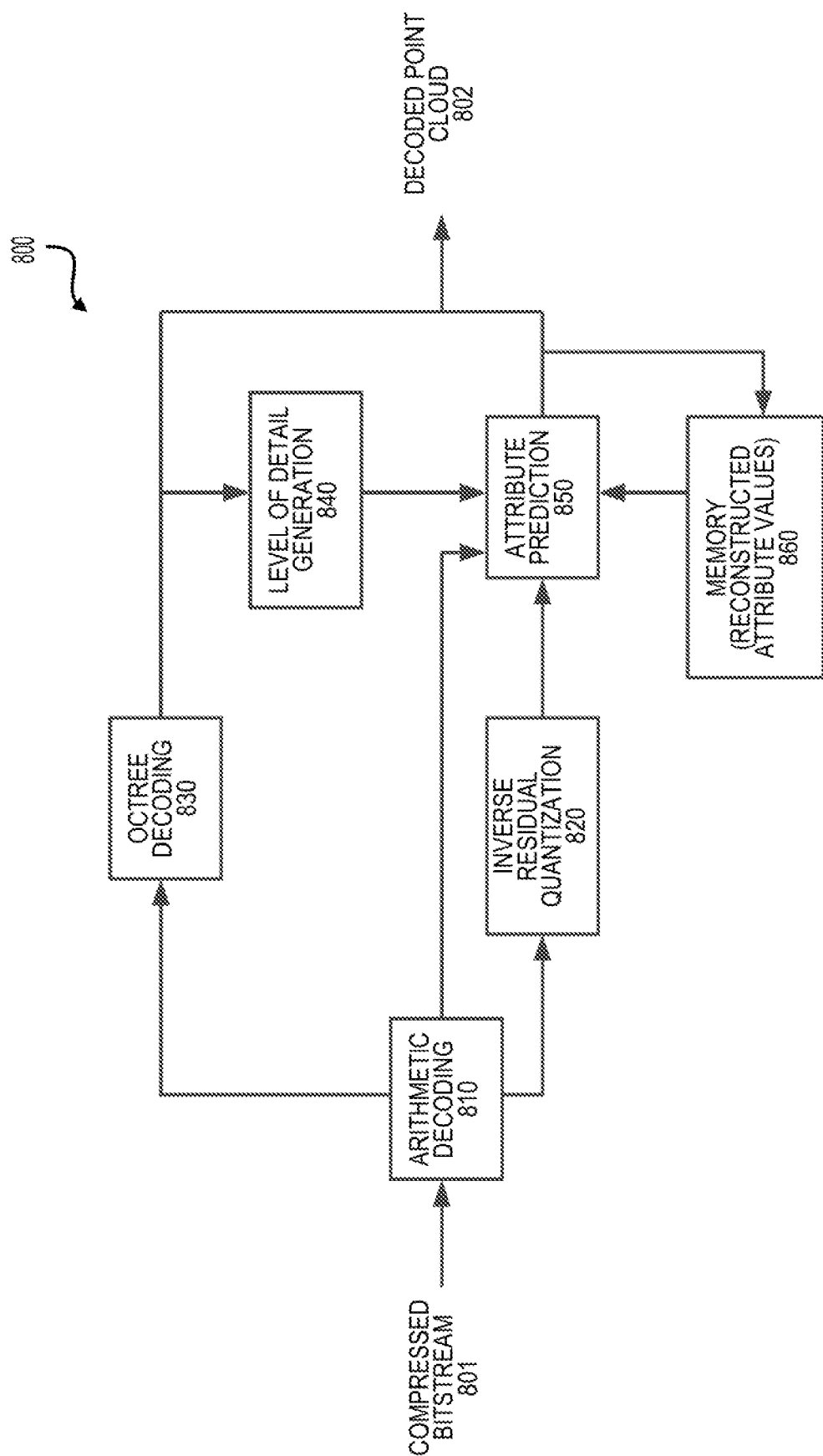
FIG. 8 shows a block diagram of a decoder for decoding a compressed bitstream carrying point cloud frames in some examples.

FIG. 8 shows a block diagram of a G-PCC decoder (800) in accordance with an embodiment. The G-PCC decoder (800) can be configured to receive a compressed bitstream and perform point cloud data decompression to decompress the bitstream to generate decoded point cloud data. In an embodiment, the G-PCC decoder (800) can include an arithmetic decoding module (810), an inverse residual quantization module (820), an octree decoding module (830), an LOD generation module (840), an attribute prediction module (850), and a memory (860) to store reconstructed attribute values.

As shown, a compressed bitstream (801) can be received at the arithmetic decoding module (810). The arithmetic decoding module (810) is configured to decode the compressed bitstream (801) to obtain quantized residuals (if generated) and occupancy codes of a point cloud. The octree decoding module (830) is configured to determine reconstructed positions of points in the point cloud according to the occupancy codes. The LOD generation module (840) is configured to re-organize the points into different LODs based on the reconstructed positions, and determine an LOD-based order. The inverse residual quantization module (820) is configured to generate reconstructed residuals based on the quantized residuals received from the arithmetic decoding module (810).

The attribute prediction module (850) is configured to perform an attribute prediction process to determine attribute predictions for the points according to the LOD-based order. For example, an attribute prediction of a current point can be determined based on reconstructed attribute values of neighboring points of the current point stored in the memory (860). In some examples, the attribute prediction can be combined with a respective reconstructed residual to generate a reconstructed attribute for the current point.

A sequence of reconstructed attributes generated from the attribute prediction module (850) together with the reconstructed positions generated from the octree decoding module (830) corresponds to a decoded point cloud (802) that is output from the G-PCC decoder (800) in one example. In addition, the reconstructed attributes are also stored into the memory (860) and can be subsequently used for deriving attribute predictions for subsequent points.

In various embodiments, the encoder (300), the decoder (400), the encoder (700), and/or the decoder (800) can be implemented with hardware, software, or combination thereof. For example, the encoder (300), the decoder (400), the encoder (700), and/or the decoder (800) can be implemented with processing circuitry such as one or more integrated circuits (ICs) that operate with or without software, such as an application specific integrated circuit (ASIC), field programmable gate array (FPGA), and the like. In another example, the encoder (300), the decoder (400), the encoder (700), and/or the decoder (800) can be implemented as software or firmware including instructions stored in a non-volatile (or non-transitory) computer-readable storage medium. The instructions, when executed by processing circuitry, such as one or more processors, causing the processing circuitry to perform functions of the encoder (300), the decoder (400), the encoder (700), and/or the decoder (800).

It is noted that the attribute prediction modules (750) and (850) configured to implement the attribute prediction techniques disclosed herein can be included in other decoders or encoders that may have similar or different structures from what is shown in FIG. 7 and FIG. 8. In addition, the encoder (700) and decoder (800) can be included in a same device, or separate devices in various examples.

According to some aspects of the disclosure, mesh compression can use coding tools different from PCC coding tools or can use PCC coding tools, such as above PCC (e.g., G-PCC, V-PCC) encoders, above PCC (e.g., G-PCC, V-PCC) decoders, and the like.

A mesh (also referred to as a mesh model, a mesh frame) of an object can include polygons that describe the surface of the object. Each polygon can be defined by vertices of the polygon in 3D space and edges that connect the vertices into the polygon. The information of how the vertices are connected (e.g., information of the edges) is referred to as connectivity information. In some examples, a mesh of an object is formed by connected triangles that describe the surface of the object. Two triangles sharing an edge are referred to as two connected triangles. In some other examples, a mesh of an object is formed by connected quadrilaterals. Two quadrilaterals sharing an edge can be referred to as two connected quadrilaterals. It is noted that meshes can be formed by other suitable polygons.

In some examples, the mesh can also include attributes, such as color, normal, and the like, associated with the vertices. The attributes can be associated with the surface of the mesh by exploiting mapping information that parameterizes the mesh with 2D attribute maps. The mapping information is usually described by a set of parametric coordinates, referred to as UV coordinates or texture coordinates, associated with the mesh vertices. 2D attribute maps (referred to as texture maps in some examples) are used to store high resolution attribute information such as texture, normals, displacements etc. Such information could be used for various purposes such as texture mapping and shading.

In some embodiments, a mesh can include components that are referred to as geometry information, connectivity information, mapping information, vertex attributes, and attribute maps. In some examples, the geometry information is described by a set of 3D positions associated with the vertices of the mesh. In an example, (x,y,z) coordinates can be used to describe the 3D positions of the vertices, and are also referred to as 3D coordinates. In some examples, the connectivity information includes a set of vertex indices that describes how to connect the vertices to create a 3D surface. In some examples, the mapping information describes how to map the mesh surface to 2D regions of the plane. In an example, the mapping information is described by a set of UV parametric/texture coordinates (u,v) associated with the mesh vertices together with the connectivity information. In some examples, the vertex attributes include scalar or vector attribute values associated with the mesh vertices. In some examples, attribute maps include attributes that are associated with the mesh surface and are stored as 2D images/videos. In an example, the mapping between the videos (e.g., 2D images/videos) and the mesh surface is defined by the mapping information.

According to an aspect of the disclosure, some techniques that are referred to as UV mapping or mesh parameterization are used to map surfaces of a mesh in the 3D domain to 2D domain. In some examples, a mesh is partitioned into patches in the 3D domain. A patch is a contiguous subset of the mesh with a boundary formed of boundary edges. A boundary edge of a patch is an edge that belongs to only one polygon of the patch, and is not shared by two adjacent polygons in the patch. Vertices of boundary edges in a patch are referred to as boundary vertices of the patch, and non-boundary vertices in a patch can be referred to as interior vertices of the patch in some examples.

In some examples, a mesh of an object is formed by connected triangles, and the mesh can be partitioned into patches, each patch is a subset of the connected triangles. A boundary edge of a patch is an edge that belongs to only one triangle in the patch and is not shared by adjacent triangles in the patch. Vertices of boundary edges in a patch are referred to as boundary vertices of the patch, and non-boundary vertices in a patch can be referred to as interior vertices of the patch in some examples.

According to an aspect of the disclosure, the patches are parameterized respectively into 2D shapes (also referred to as UV patches) in some examples. The 2D shapes can be packed (e.g., oriented and placed) into maps that are also referred to as atlases in some examples. In some examples, the maps can be further processed using 2D image or video processing techniques.

In an example, a UV mapping technique generates a UV atlas (also referred to as UV map) and one or more texture atlas (also referred to as texture map) in 2D corresponding to patches of a 3D mesh. The UV atlas includes assignments of 3D vertices of the 3D mesh to 2D points in a 2D domain (e.g., a rectangular). The UV atlas is a mapping between coordinates of the 3D surface to coordinates of 2D domain. In an example, a point in the UV atlas at a 2D coordinates (u,v) has a value that is formed by coordinates (x, y, z) of a vertex in the 3D domain. In an example, a texture atlas includes color information of the 3D mesh. For example, a point in the texture atlas at the 2D coordinates (u,v) (which has a 3D value of (x,y,z) in the UV atlas) has a color that specifies the color attribute of a point at (x, y, z) in the 3D domain. In some examples, the coordinates (x, y, z) in the 3D domain are referred to as 3D coordinates, or xyz coordinates, and the 2D coordinates (u,v) are referred to as uv coordinates or UV coordinates.

According to some aspects of the disclosure, mesh compression can be performed by representing a mesh using one or more 2D maps (also referred to as 2D atlas in some examples), and then encoding the 2D maps using image or video codecs. Different techniques can be used to generate the 2D maps.

Figure 9:
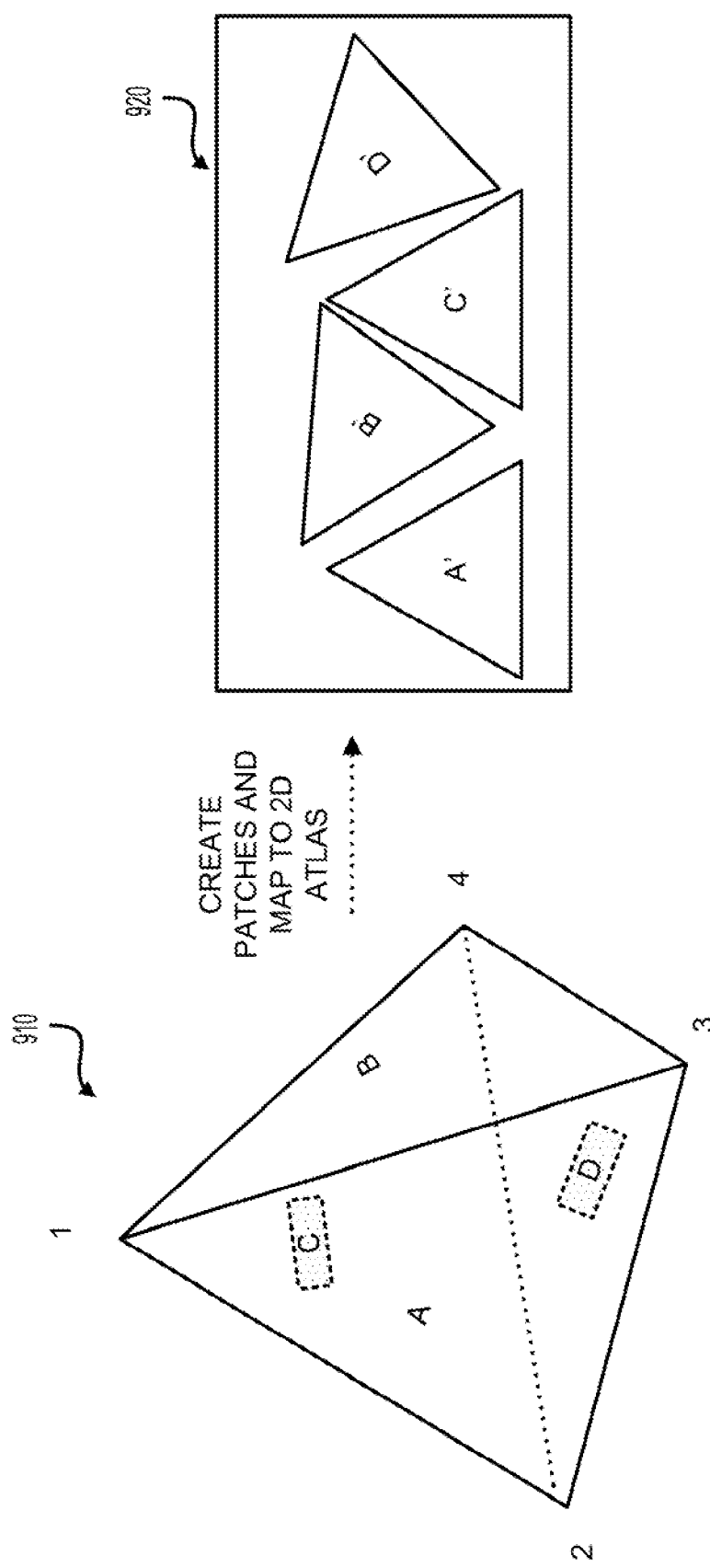
FIG. 9 shows a diagram illustrating a mapping of a mesh to an atlas in some examples.

FIG. 9 shows a diagram illustrating a mapping of a 3D mesh (910) to a 2D atlas (920) in some examples. In FIG. 9 example, the 3D mesh (910) includes four vertices 1-4 that form four patches A-D. Each of the patches has a set of vertices and associated attribute information. For example, the patch A is formed by the vertices 1, 2 and 3 that are connected into a triangle; the patch B is formed by the vertices 1, 3 and 4 that are connected into a triangle; the patch C is formed by the vertices 1, 2 and 4 that are connected into a triangle; and the patch D is formed by the vertices 2, 3 and 4 that are connected into a triangle. In some examples, the vertices 1, 2, 3 and 4 can have respective attributes, and the triangles formed by the vertices 1, 2, 3 and 4 can have respective attributes.

In an example, the patches A, B, C and D in 3D are mapped to a 2D domain, such as the 2D atlas (920) that is also referred to as UV atlas (920) or map (920). For example, the patch A is mapped to a 2D shape (also referred to as UV patch) A' in the map (920), the patch B is mapped to a 2D shape (also referred to as UV patch) B' in the map (920), the patch C is mapped to a 2D shape (also referred to as UV patch) C' in the map (920), and the patch D is mapped to a 2D shape (also referred to as UV patch) D' in the map (920). In some examples, the coordinates in 3D domain are referred to as (x, y, z) coordinates, the coordinates in 2D domain, such as the map (920), are referred to as UV coordinates. A vertex in the 3D mesh can have corresponding UV coordinates in the map (920).

The map (920) can be geometry map with geometry information, or can be texture map with color, normal, textile, or other attribute information, or can be occupancy map with occupancy information.

While each patch is represented by a triangle in the FIG. 9 example, it is noted that a patch can include any suitable number of vertices that are connected to form a contiguous subset of the mesh. In some examples, the vertices in a patch are connected into triangles. It is noted that the vertices in a patch can be connected using other suitable shapes.

In an example, the geometry information of the vertices can be stored into a 2D geometry map. For example, the 2D geometry map stores the (x, y, z) coordinates of sampling points at a corresponding point in the 2D geometry map. For example, a point in the 2D geometry map at (u, v) position has a vector value of 3 components respectively corresponding to the x, y and z values of a corresponding sampling point in the 3D mesh.

According to an aspect of the disclosure, areas in a map may not be fully occupied. For example, in FIG. 9, the areas that are outside the 2D shapes A', B', C' and D' are undefined. The sample values of the areas that are outside the 2D shapes A', B', C' and D' after decoding can be discarded. In some cases, an occupancy map is used to store some extra information for each pixel, such as storing a binary value to identify if a pixel belongs to a patch or is undefined.

According to an aspect of the disclosure, a dynamic mesh is a mesh where at least one of the components (geometry information, connectivity information, mapping information, vertex attributes and attribute maps) varies with time. A dynamic mesh can be described by a sequence of meshes (also referred to as mesh frames). The dynamic mesh may require a large amount of data since the dynamic mesh may include a significant amount of information changing over time. Compression technologies of meshes can allow efficient storage and transmission of media contents in the mesh representation.

In some examples, a dynamic mesh can have constant connectivity information, time varying geometry and time varying vertex attributes. In some examples, a dynamic mesh can have time varying connectivity information. In an example, digital content creation tools usually generate dynamic meshes with time varying attribute maps and time varying connectivity information. In some examples, volumetric acquisition techniques are used to generate dynamic meshes. The volumetric acquisition techniques can generate a dynamic mesh with time varying connectivity information especially under real time constraints.

Some techniques are used for mesh compression. In some examples, UV atlas sampling and V-PCC can be used for mesh compression. For example, the UV atlas is sampled on regular grids to generate a geometry image with regular grid samples. Connectivity of the regular grid samples can be inferred. The regular grid samples can be considered as points in a point cloud, and thus can be coded using PCC codec, such as V-PCC codec.

According to an aspect of the disclosure, in order to compress the 3D mesh information efficiently, 2D maps, such as a geometry map, a texture map (also referred to as attribute map in some examples), an occupancy map, and the like may be down-sampled before being coded.

Figure 10:
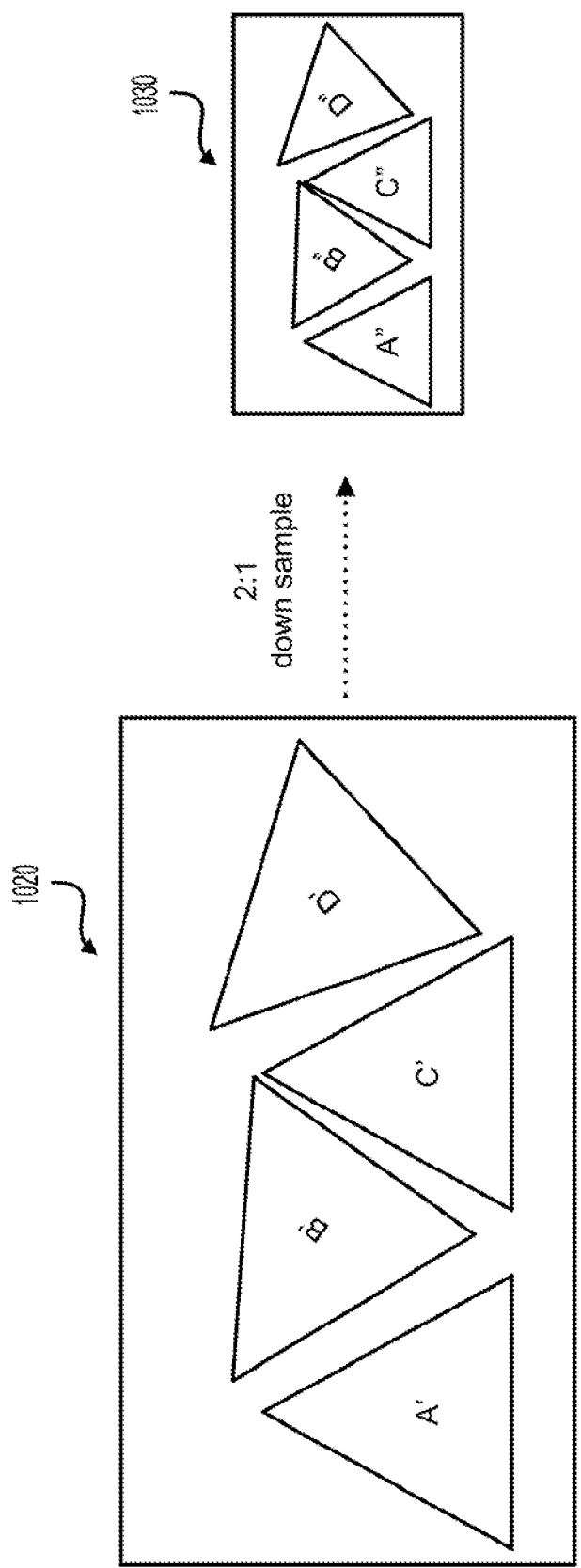
FIG. 10 shows a diagram illustrating down sampling in some examples.

FIG. 10 shows a diagram illustrating down sampling in some examples. In FIG. 10, a map (1020) is down-sampled by a factor of 2 in both horizontal direction and the vertical direction, and a down-sampled map (1030) is generated accordingly. The width (e.g., the number of pixels in the horizontal direction) of the down-sampled map (1030) is ½ of the width (e.g., the number of pixels in the horizontal direction) of the map (1020), and height (e.g., the number of pixels in the vertical direction) of the down-sampled map (1030) is ½ of the height (e.g., the number of pixels in the vertical direction) of the map (1020).

In FIG. 10, the map (1020) includes 2D shapes (also referred to as UV patches) A', B', C' and D', and the down sampled map (1030) includes sampled 2D shapes A", B", C" and D" respectively corresponding to the 2D shapes A', B', C' and D'. The down-sampled map (1030) is then coded by an image or video encoder at the mesh encoder side in some examples.

In some examples, at the mesh decoder side, the down-sampled maps are decoded. After the decoding of the down-sampled maps, the down-sampled maps are recovered to the original resolution (e.g., the original number of pixels in the vertical direction and the original number of pixels in the horizontal direction) for reconstructing the 3D mesh.

Generally, a dynamic mesh sequence requires a large amount of data since the dynamic mesh sequence may consist of a significant amount of information changing over time. A sampling step applied to the 2D maps (e.g., UV atlas, attribute maps) can help to reduce the bandwidth needed to represent the mesh information. However, the sampling step can also remove key information such as some critical geometry shape of the 3D mesh during the down-sampling.

In some examples, adaptive sampling techniques can be used to process the 2D atlas (also referred to as maps in 2D) without loosing too much important information. The adaptive sampling techniques can be used for static mesh (one mesh frame or mesh content does not change over time) compression and dynamic mesh compression. The various adaptive sampling techniques can be applied individually or by any form of combinations. In the following description, the adaptive sampling methods are applied to 2D atlas (e.g., maps in 2D), which can be either the geometry map or the attribute (texture) map, or both.

Figure 11:
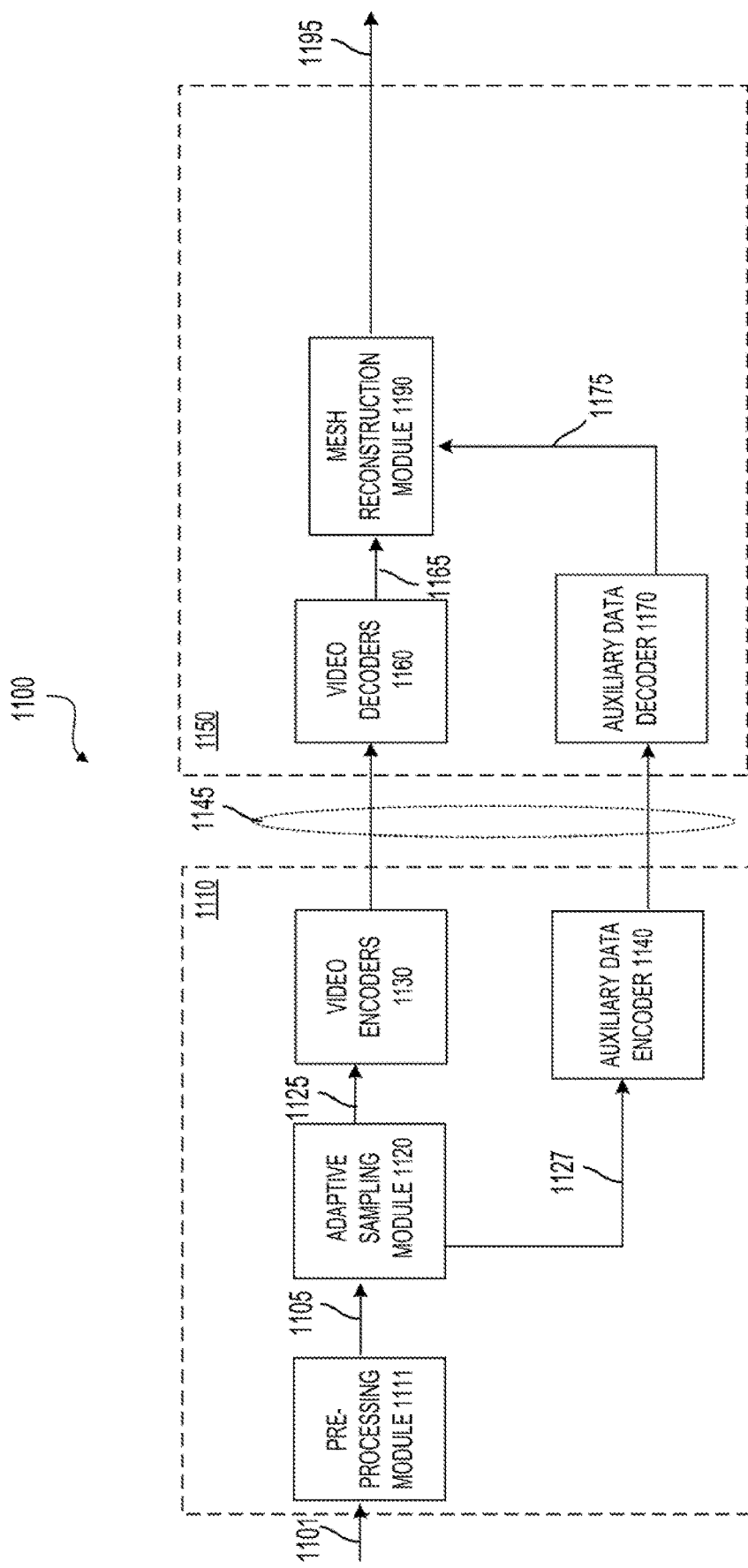
FIG. 11 shows a diagram of a framework for mesh compression according to some embodiments of the disclosure.

FIG. 11 shows a diagram of a framework (1100) for mesh compression according to some embodiments of the disclosure. The framework (1100) includes a mesh encoder (1110) and a mesh decoder (1150). The mesh encoder (1110) receives an input mesh (1101) (a mesh frame in case of a dynamic mesh processing), and encodes the input mesh (1101) into a bitstream (1145), and the mesh decoder (1150) decodes the bitstream (1145) to generate a reconstructed mesh (1195) (a reconstructed mesh frame in case of a dynamic mesh processing).

The mesh encoder (1110) can be any suitable device, such as a computer, a server computer, a desktop computer, a laptop computer, a tablet computer, a smart phone, a gaming device, an AR device, a VR device, and the like. The mesh decoder (1150) can be any suitable device, such as a computer, a client computer, a desktop computer, a laptop computer, a tablet computer, a smart phone, a gaming device, an AR device, a VR device, and the like. The bitstream (1145) can be transmitted from the mesh encoder (1110) to the mesh decoder (1150) via any suitable communication network (not shown).

In the FIG. 11 example, the mesh encoder (1110) includes a pre-processing module (1111), an adaptive sampling module (1120), video encoders (1130) and an auxiliary data encoder (1140) coupled together. The video encoders (1130) are configured to encode image or video data, such as 2D maps in a representation for a 3D mesh.

In the FIG. 11 example, the pre-processing module (1111) is configured to perform suitable operations onto the input mesh (1101) to generate a mesh with UV atlas (1105). For example, the pre-processing module (1111) can perform a series of operations that includes tracking, remeshing, parameterization, and voxelization. In FIG. 11 example, the series of operations can be encoder-only and is not a part of the decoding process. In some examples, the mesh with UV atlas (1105) includes 3D location information of vertices, a UV atlas that maps the 3D location information to 2D, and other 2D attribute maps (e.g., 2D color map, and the like).

It is noted that in some examples, the input mesh (1101) is in the form of a mesh with UV atlas, then the pre-processing module (1111) can forward the input mesh (1101) to be the mesh with UV atlas (1105).

The adaptive sampling module (1120) receives the mesh with UV atlas (1105) and performs adaptive sampling to generate adaptively sampled maps (1125). In some examples, the adaptive sampling module (1120) can use various techniques to detect characteristics in the maps or in different regions of the maps, such as information density in the maps, and determine different sampling rates for sampling the maps or different regions of the maps based on the characteristics. Then, the 2D maps can be sampled according to the different sampling rates to generate the adaptively sampled maps (1125). The adaptively sampled maps (1125) can include a geometry map (also referred to as geometry image in some examples), an occupancy map, other attributes maps (e.g., a color map), and the like.

The video encoders (1130) can encode the adaptively sampled maps (1125) into the bitstream (1145) using the image encoding and/or video encoding techniques.

The adaptive sampling module (1120) also generates auxiliary data (1127) that indicates assistance information used for the adaptive sampling. The auxiliary data encoder (1140) receives the auxiliary data (1127), and encodes the auxiliary data (1127) into the bitstream (1145).

The operations of the adaptive sampling module (1120) and the auxiliary data encoder (1140) will be further described in the present disclosure.

In the FIG. 11 example, the bitstream (1145) is provided to the mesh decoder (1150). The mesh decoder (1150) includes video decoders (1160), an auxiliary data decoder (1170), and a mesh reconstruction module (1190) coupled together as shown in FIG. 11. In an example, the video decoders (1160) correspond the video encoders (1130), and can decode a portion of the bitstream (1145) that is encoded by the video encoder (1130) and generate decoded maps (1165). In some examples, the decoded maps (1165) include a decoded UV map, one or more decoded attribute maps, and the like. In some examples, the decoded maps (1165) include a decoded occupancy map (e.g., initial decoded maps).

In the FIG. 11 example, the auxiliary data decoder (1170) corresponds the auxiliary data encoder (1140), and can decode a portion of the bitstream (1145) that is encoded by the auxiliary data encoder (1140) and generate decoded auxiliary data (1175).

In the FIG. 11 example, the decoded maps (1165) and the decoded auxiliary data (1175) are provided to mesh reconstruction module (1190). The mesh reconstruction module (1190) generates the reconstructed mesh (1195) based on the decoded maps (1165) and the decoded auxiliary data (1175). In some examples, the mesh construction module (1190) can determine vertices and information of the vertices in the reconstructed mesh (1195), such as respective 3D coordinates, UV coordinates, color, and the like associated with the vertices. The operations of the auxiliary data decoder (1170) and the mesh reconstruction module (1190) will be further described in the present disclosure.

It is noted that components in the mesh encoder (1110), such as the pre-processing module (1111), the adaptive sampling module (1120), the video encoders (1130) and the auxiliary data encoder (1140) can be respectively implemented by various techniques. In an example, a component is implemented by integrated circuitry. In another example, a component is implemented using software that can be executed by one or more processors.

It is noted that components in the mesh decoder (1150), such as the video decoders (1160), the auxiliary data decoder (1170), and the mesh reconstruction module (1190), can be respectively implemented by various techniques. In an example, a component is implemented by integrated circuitry. In another example, a component is implemented using software that can be executed by one or more processors.

In some embodiments, the sampling adaptation can be based on map type. In some examples, the adaptive sampling module (1120) can apply different sampling rates to different types of maps. For example, different sampling rates can be applied to a geometry map and an attribute map. In an example, a mesh is a model for an object with a regular shape and abundance texture. For example, the object has a rectangular shape, but abundance colors. Thus, the information density of the geometry map is relatively low. In an example, the adaptive sampling module (1120) applies a first sampling rate of 2:1 on the geometry map (in both vertical direction and horizontal direction) and applies a second sampling rate of 1:1 on the texture map (in both vertical direction and horizontal direction).

In some examples, the sampling rate of A:B in a direction indicates to generate B samples from A pixels in the original map in the direction. For example, the sampling rate of 2:1 in the horizontal direction indicates to generate 1 sample for every two pixels in the original map in the horizontal direction. The sampling rate of 2:1 in the vertical direction indicates to generate 1 sample for every two pixels in the original map in the vertical direction.

In some examples, a term of sampling step is used. A sampling step in a direction indicates a number of pixels between two adjacent sampling positions in the direction. For example, a sampling step of two in the horizontal direction indicates to two pixels between adjacent sampling positions in the horizontal direction; and a sampling step of two in the vertical direction indicates to two pixels between adjacent sampling positions in the vertical direction. It is noted that, in the present disclosure, the sampling rate is equivalent to the sampling step. For example, a sampling rate of 2 (e.g., 2:1) is equivalent to two pixels between adjacent sampling position.

In some embodiments, the sampling adaptation is based on sub-regions in a map. Different sampling rates can be applied on different portions of the map. In some examples, some rows of pixels have less information to be preserved, then larger sampling rates can be applied along these rows, resulting a smaller number of sample rows to be coded. In some examples, some columns of pixels have less information to be preserved, then larger sampling rates can be applied along these columns, resulting a smaller number of sample columns to be coded. For other regions, smaller sampling rates are applied to keep the loss of information minimum after the sampling.

Figure 12:
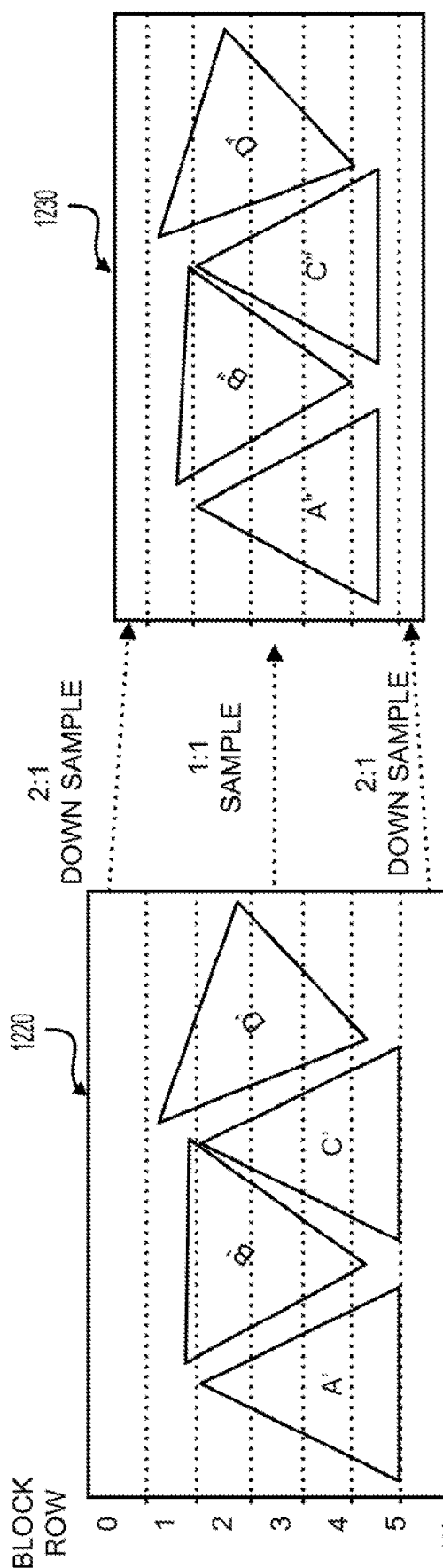
FIG. 12 shows a diagram of adaptive sampling in some examples.

FIG. 12 shows a diagram of adaptive sampling in some examples. A map (1220) is divided into several block rows, each block row includes a fixed number of sample (pixel) rows. Different sampling rates are applied to the block rows in the vertical direction to generate an adaptively sampled map (1230). For example, each block row is a CTU row (also referred to as CTU line) and includes 64 rows of samples (also referred to as pixels). In the FIG. 12 example, for block row 0 and block row 6 in the map (1220), a first sampling rate of 2:1 is applied in the vertical direction, and resulting 32 rows of samples for each of block row 0 and block row 6 in the adaptively sampled map (1230) after sampling. For block rows 1 to 5 in the map (1220), a second sampling rate of 1:1 is applied in the vertical direction, resulting 64 of rows of samples for each of block rows 1 to 5 in the adaptively sampled map (1230).

It is noted that a sampling rate of 1:1 is applied to the horizontal direction in FIG. 12.

In some examples, the adaptively sampled map (1230) is then encoded by an image or video encoder, such as the video encoders (1130). At the decoder side, in an example, the adaptively sampled map (1230) is decoded. After decoding, the top 32 rows of samples are recovered (up-sampled) to an original resolution, such as 64 rows of samples; and the bottom 32 rows of samples are recovered (up-sampled) to an original resolution, such as 64 rows of samples.

In some other examples, a to-be-coded map in a 2D representation of a 3D mesh can be divided into a number of sub-regions. Examples of such division inside a map (e.g., a picture) include slice, tile, tile group, coding tree unit, and the like. In some examples, different sampling rates can be applied to different sub-regions. In an example, the different sampling rates associated with the different sub-regions can be signaled in a bitstream that carries the 3D mesh. At the decoder side, after decoding of the adaptively sampled map, each sub region is recovered to its original resolution according to a sampling rate associated with the sub region.

In some examples, the recovering process of the adaptively sampled map to the original resolution is referred to as an inverse sampling process that generates a recovered map. After the recovery from the inverse sampling process, the output of the recovered map in the form of a 2D atlas can be used for 3D mesh reconstruction.

While the example in FIG. 12 shows adaptive sampling to different block rows in the vertical direction, similar adaptive sampling can be applied to different columns in the horizontal direction, or can be applied in both vertical direction and horizontal direction.

In some embodiments, sampling adaptation is based on patches. In some examples, different patches in a map can have different sampling rates.

Figure 13:
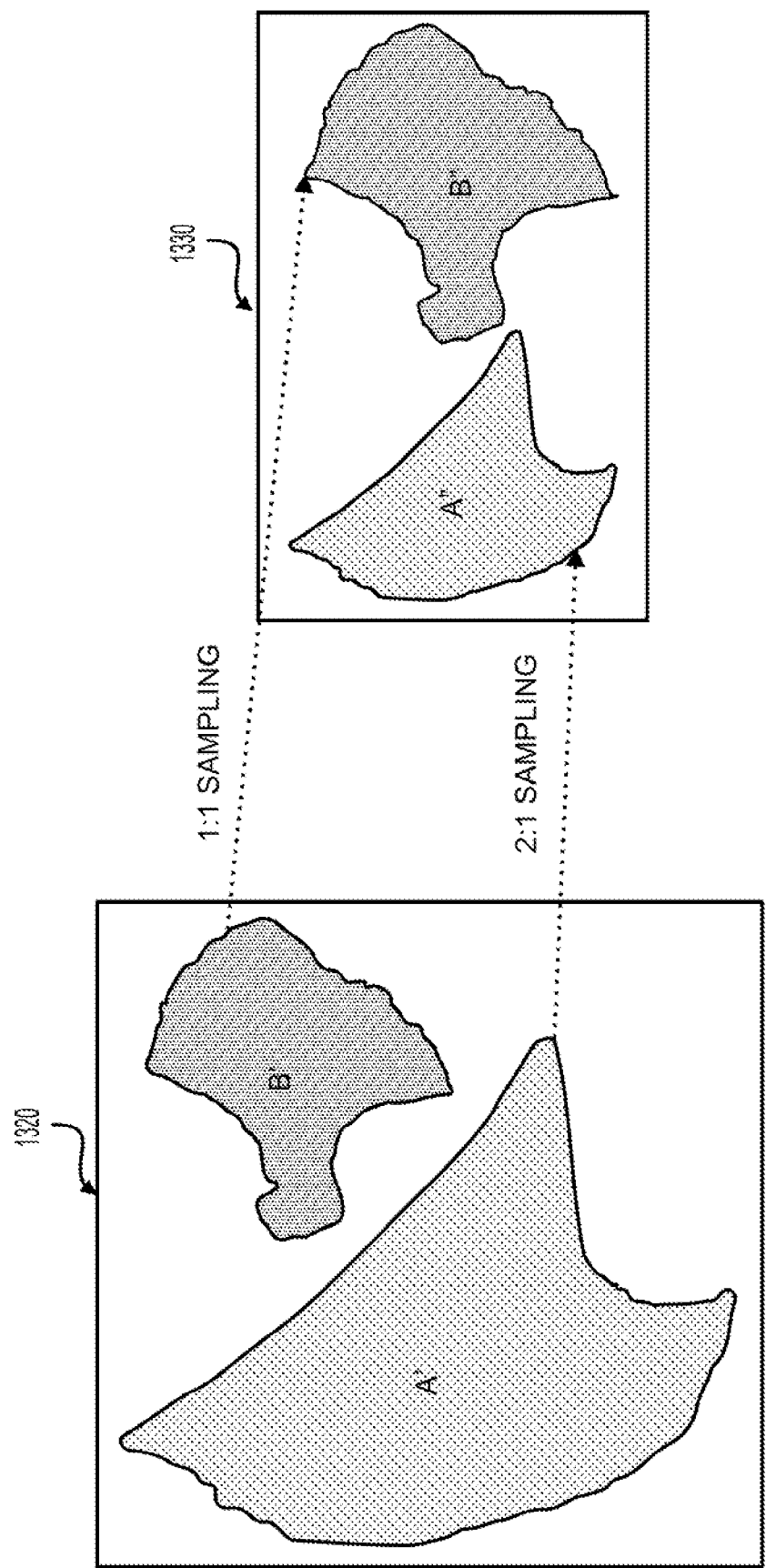
FIG. 13 shows a diagram of adaptive sampling in some examples.

FIG. 13 shows a diagram of adaptive sampling in some examples. A map (1320), such as a 2D atlas with high resolution, includes multiple 2D shapes that are also referred to as UV patches corresponding to patches in 3D mesh, such as a first 2D shape A' and a second 2D shape B'. In the FIG. 13 example, a first sampling rate of 2:1 is applied to the first 2D shape A' in both vertical direction and horizontal direction to generate a first sampled 2D shape A"; and a second sampling rate of 1:1 is applied to the second 2D shape B' in both vertical direction and horizontal direction to generate a second sampled 2D shape B". The first sampled 2D shape A" and the second sampled 2D shape B" are placed in a new map that is referred to as an adaptively sampled map (1330).

In the FIG. 13 example, the first sampled 2D shape A" is smaller than the first 2D shape A', and the second sampled 2D shape B" is of the same size as the second 2D shape B'. The adaptively sampled map (1330) is encoded by an image or video encoder, such as the video encoders (1130), into a bitstream that carries the 3D mesh. In some examples, sampling rates associated with the sampled 2D shapes are encoded, for example by the auxiliary data encoder (1140), into the bitstream that carries the 3D mesh.

In some examples, at a decoder side, an image/video decoder, such as the video decoders (1160), decodes an initial map, such as the adaptively sampled map (1330) from the bitstream. Further, sampling rates associated with sampled 2D shapes are decoded from the bitstream, for example by the auxiliary data decoder (1170). According to the sampling rates associated with the sampled 2D shapes, the sampled 2D shapes in the adaptively sampled map (1330) are recovered to original sizes (e.g., same number of pixels in the vertical direction and horizontal direction) to generate recovered map. The recovered map is then used for 3D mesh reconstruction.

According to an aspect of the disclosure, the adaptive sampling information, such as the sampling rates for different map types, the sampling rates for different sub-regions, the sampling rates for different patches, and the like is known at the mesh encoder side and the mesh decoder side. In some examples, the adaptive sampling information is suitable encoded into the bitstream that carries the 3D mesh. Thus, the mesh decoder and the mesh encoder can operate based on the same adaptive sampling information. The mesh decoder can recover the maps to the correct sizes.

According to an aspect of the disclosure, a mesh encoder, such as the mesh encoder (1110) can perform 2D atlas sampling (also referred to as UV atlas sampling). For example, the adaptive sampling module (1120) can receive the mesh with UV atlas (1105). Each vertex of the mesh with the UV atlas (1105) has a corresponding point in the UV atlas, and the position of the corresponding point in the UV atlas is specified by UV coordinates. In the UV atlas, the corresponding point can have a vector value including 3D coordinates (e.g., (x, y, z)) of the vertex in the 3D space. Further, the mesh with the UV atlas (1105) includes one or more attribute maps that store the attribute values associated with the vertex as attribute values of a pixel at a position specified by the UV coordinates in the one or more attribute maps. For example, a color map can store the color of the vertex as a color of a pixel at a position specified by the UV coordinates in the color map.

The adaptive sampling module (1120) can apply the adaptive sampling techniques on the mesh with the UV atlas (1105), and output the adaptively sampled maps (1125) (also referred to as adaptively sampled atlases in some examples) that can include, for example, a sampled geometry map (also referred to as sampled UV map or sampled UV atlas), one or more sampled attribute maps (also referred to as texture maps in some examples), and the like. In some example, the adaptively sampled maps (1125) includes a sampled occupancy map.

According to an aspect of the disclosure, the same sampling rate configuration can be applied to the various maps, such as the geometry map, the attribute map, the occupancy map and the like to generate the adaptively sampled maps. In some examples, the adaptive sampling module (1120) can generate the adaptively sampled maps (1125) by sampling on the UV atlas (e.g., based on sampling positions on the UV atlas). The adaptive sampling module (1120) can determine sampling positions on the UV atlas, and then generate the adaptively sampled maps according to the sampling positions on the UV atlas. For example, after a sampling position on the UV atlas is determined for example according to a sampling rate, then the adaptive sampling module (1120) determines a position of a sampled point in each of the sampled maps (1125), and then determines values of the respective sampled points in the sampled maps (1125).

In an example, when a sampling position on the UV atlas is inside a polygon defined by the vertices of the mesh, the sampling position is occupied and then the sampled point in the sampled occupancy map corresponding to the sampling position is set to be occupied (e.g., the value of the sampled point in the sampled occupancy map is "1"). However, when the sampling position is not inside any polygon defined by the mesh vertices, the sampling position is unoccupied, then the sampled point in the sampled occupancy map corresponding to the sampling position is set to be unoccupied (e.g., the value of the sampled point in the sampled occupancy map is "0").

For each occupied sampling position on the UV atlas, the adaptive sampling module (1120) can determine 3D (geometry) coordinates at the occupied sampling position, and assign the determined 3D coordinates to be the vector value of the corresponding sampled point in the sampled geometry map (also referred to as sampled UV atlas). Similarly, the adaptive sampling module (1120) can determine attribute value (e.g., color, normal and the like) at the occupied sampling position and assign the determined attribute value to be the attribute value of the corresponding sampled point in the sampled attribute map. In some examples, the adaptive sampling module (1120) can determine the 3D coordinates and attributes of the occupied sampling positions by interpolating from the associated polygon vertices.

In an example, the mesh is formed by triangles. A sampling position is inside a triangle defined by three vertices of the mesh, thus the sampling position is an occupied sampling position. The adaptive sampling module (1120) can determine 3D (geometry) coordinates at the occupied sampling position according to, for example, weighted average 3D coordinates of 3D coordinates of the three vertices of the triangle. The adaptive sampling module (1120) can assign the weighted average 3D coordinates to be the vector value of the corresponding sampled point in the sampled geometry map. Similarly, the adaptive sampling module (1120) can determine attribute value at the occupied sampling position according to, for example, a weighted average attribute value (e.g., weighted average color, weighted average normal, and the like) of attributes of the three vertices of the triangle. The adaptive sampling module (1120) can assign the weighted average attribute value to be the attribute value of the corresponding sampled point in the sampled attribute map.

In some examples, the sampling rate (SR) can be consistent over the whole 2D atlas (e.g., the geometry map, the attribute map and the like), but the sampling rate for u axis and v axis may be different. Using different sampling rates in the u axis and v axis makes anisotropic remeshing possible. As described with reference to FIG. 12 and FIG. 13, in some examples, a 2D atlas can be divided into multiple regions, such as slices or tiles or patches, and the multiple regions can have respective sampling rates. For example, a mesh is formed of connected triangles, the mesh can be partitioned into several patches, and each patch includes a subset of the whole mesh. Different sampling rates can be applied to the respective patches for example by the adaptive sampling module (1120).

According to an aspect of the disclosure, a mesh encoder, such as the mesh encoder (1110) can determine suitable sampling rate for each region in a 2D atlas.

In some examples, the adaptive sampling module (1120) can determine sampling rate distribution over a 2D atlas (e.g., the geometry map, the attribute map, and the like). For example, the adaptive sampling module (1120) can determine a specific sampling rate (SR) for a region according to the characteristics of the region. In an example, the specific sampling rate is determined based on frequency spectrum of the region. For example, a rich-textured region (or the entire 2D atlas) can have high spatial frequency components in the texture attribute values, the adaptive sampling module (1120) can assign sampling rate (e.g., lower sampling rate, lower sampling step) suitable for the high spatial frequency components to the rich-textured region. In another example, a region (or the entire 2D atlas) with high activity can include high spatial frequency components in the coordinates (e.g., 3D coordinates, UV coordinates), the adaptive sampling module (1120) can assign sampling rate (e.g., lower sampling rate, lower sampling step) suitable for the high activity to the region. In another example, a smooth region (or the entire 2D atlas) can lack high spatical frequency components in the texture attribute values, the adaptive sampling module (1120) can assig sampling rate (e.g., higher sampling rate, higher sampling step) suitable for the smooth region. In another example, a region (or the entire 2D atlas) with low activity can lack high spatial frequency components in the coordinates (e.g., 3D coordinates, UV coordinates), the adaptive sampling module (1120) can assign sampling rate (e.g., higher sampling rate, lower sampling step) suitable for the low activity in the region.

According to an aspect of the disclosure, the sampling rate can be represented by the oversampling ratio (OR) parameter. The OR parameter is defined as the ratio between the number of sampling points in a region and the number of original vertices in the region. When the OR parameter for a region is larger than 1, the OR parameter indicates that the region is oversampled compared with the number of original vertices; when the OR parameter of a region is smaller than 1, the OR parameter indicates that the region is undersampled compared with the number of original vertices. For example, a region of a mesh consists of 1000 vertices, and when a specific sampling rate (SR) is applied in the region, 3000 sampling points are obtained. Then, the OR parameter of the region equals to 3 with the SR, i.e., OR(SR)=3.

In some embodiments, the adaptive sampling module (1120) can use an algorithm to determine a final sampling rate for a region to achieve a closest OR parameter to a predefined target OR parameter. For example, for a specific region i (e.g., i is a region index for identifying the specific region), a target OR (denoted by TORO parameter is defined for the specific region i. The adaptive sampling module (1120) can determine a final sampling rate of the specific region i (denoted by $SR_i$) as a sampling rate that produces the closest OR parameter to the target OR ($TOR_i$) parameter, such as represented by Eq. (1)

$$SR_i = \mathop{\mathrm{argmin}}_{SR} |OR(SR) - TOR_i| \qquad \text{Eq. (1)}$$

In an example, the adaptive sampling module (1120) can try multiple sampling rates, and select one of the multiple sampling rates that produces the closest OR parameter to the target OR parameter. In another example, the adaptive sampling module (1120) can use an algorithm, such as a binary search algorithm and the like, to perform a search in a search range for sampling rates to determine a final sampling rate that produces the closest OR parameter to the target OR parameter.

In some embodiments, the adaptive sampling module (1120) can use an algorithm to determine a final sampling rate for a specific region i (e.g., i is a region index for identifying the specific region) that can achieve a maximum OR parameter that is smaller than a predefined threshold (denoted by $Th_0$). In some examples, the algorithm starts from a base sampling rate (BSR) that is relatively small (e.g., 1:1), and uses an iterative process with iterative cycles to determine the final sampling rate. In each iterative cycle to test a current BSR, the OR parameter for the region is determined. When the OR parameter is smaller than the threshold $Th_0$, the current BSR is the final sampling rate for the specific region; and when the OR parameter is larger than the threshold $Th_0$, a new BSR is calculated based on the current BSR. For example, a scaling factor $F_0$ (e.g., larger than 1) is applied to the current BSR to determine a new BSR. Then, the new BSR becomes the current BSR, and the iterative process goes to a next iterative cycle. In some examples, the process to determine the final sampling rate of a region (i) is determined as Eq. (2):

$$SR_i = \begin{cases} BSR & \text{if } OR(BSR) < Th_0 \\ \text{round}(BSR \times F_0) & \text{otherwise} \end{cases} \quad \text{Eq. (2)}$$

where $SR_i$ is the final sampling rate, $Th_0$ is a threshold for the OR parameter, and $F_0 > 1$ is a scaling factor to increase the BSR. Thus, when the OR parameter with a BSR is small than the threshold $Th_0$, the current region will just use the BSR as the final sampling rate, otherwise the final sampling rate is changed by the scaling factor $F_0$. The process can be conducted iteratively until $OR(SR_i)$ is smaller than the threshold $Th_0$.

In some embodiments, the adaptive sampling module (1120) can use an algorithm to determine a final sampling rate (SRO) for a specific region i (e.g., i is a region index for identifying the specific region) that can achieve an OR parameter in a specific range, such as smaller than a first predefined threshold (denoted by $Th_0$) and larger than a second predefined threshold (denoted by $Th_1$). In some examples, the algorithm starts from any base sampling rate (BSR), and uses an iterative process with iterative cycles to determine the final sampling rate. In each iterative cycle to test a current BSR, the OR parameter for the specific region is determined. When the OR parameter is in the specific range, such as smaller than the first predefined threshold $Th_0$ and larger than the second predefined threshold by $Th_1$, the current BSR is the final sampling rate for the specific region. However, when the OR parameter is larger than the first predefined threshold $Th_0$, a first scaling factor $F_0$ (e.g., larger than 1) is applied to the current BSR to determine a new BSR; when the OR parameter is smaller than the second predefined threshold $Th_1$, a second scaling factor $F_1$ (e.g., smaller than 1) is applied to the current BSR to determine a new BSR. Then, the new BSR becomes the current BSS, and the iterative process goes to a next iterative cycle.

In some examples, the process to determine the final sampling step of a region i is determined as Eq. (3):

$$SR_i = \begin{cases} BSR & \text{if } Th_1 < OR(BSR) < Th_0 \\ \text{round}(BSR \times F_0) & \text{else if } OR(BSR) \geq Th_0 \\ \text{round}(BSR \times F_1) & \text{otherwise} \end{cases} \quad \text{Eq. (3)}$$

where BSR denotes the base sampling rate, $Th_0$ denotes the first predefined threshold and $Th_1$ denotes the second predefined threshold, and $F_0 > 1$ denotes the first scaling factor to increase the BSR, and $0 < F_1 < 1$ denotes the second scaling factor to decrease the BSR.

It is noted that the scaling factors $F_0$ and $F_1$ can be different for each region. When the OR parameter with the BSR is within the specific range defined by the thresholds (e.g., $Th_0$ and $Th_1$), the current region can use the BSR as the final sampling rate. When the OR parameter with the BSR is equal to or larger than $Th_0$, the final sampling rate is increased by the scaling factor $F_0$. When the OR parameter with the BSR is equal to or smaller than $Th_1$, the final sampling rate is decreased by the scaling factor $F_1$. The process can be conducted iteratively until $OR(SR_i)$ is in the range defined by $Th_0$ and $Th_1$.

According to some aspects of the disclosure, the adaptive sampling module (1120) can place regions with different sampling rates (or different sampling steps) in a single map.

It is noted that when adaptive sampling rates are applied, sizes of sampled regions in a sampled map can change by different ratios compared with the original UV atlas, or compared with a case when uniform sampling rate is used. The adaptive sampling module (1120) can place sampled regions with different sampling rates in a sampled map and to keep the sampled regions non-overlapped with each other, thus each point in the sampled map has a one-to-one correspondence to a specific region.

In some examples, the adaptive sampling module (1120) can determine a bounding box for each sampled region, and then place the sampled regions according to the bounding box. In an example, for a specific region in the original UV atlas, $u_{min}$ is the minimum u coordinate of all of the vertices in the specific region, and $v_{min}$ is the minimum v coordinates of all of the vertices in the specific region. Based on the minimum u coordinate and the minimum v coordinate, the adaptive sampling module (1120) can determine a bounding box for a sampled region corresponding to the specific region. For example, a top-left corner of the bounding box for the sampled region can be placed at position of $(u_o, v_o)$ in the sampled map, the position can be calculated by $$u_o = \left\lceil \frac{u_{min}}{SR} \right\rceil \text{ and } v_o = \left\lceil \frac{v_{min}}{SR} \right\rceil,$$

where SR denotes the sampling rate applied to the specific region when the same sampling rate is used in the u direction and the v direction, the $\lceil C \rceil$ denotes a ceiling function that determines the least integer that is greater than the value C.

In some embodiments, the adaptive sampling module (1120) can place the sampled regions into the sampled map one by one with a certain order. To place a current sampled region, the adaptive sampling module (1120) can first place the current sampled region, according to the position $(u_o, v_o)$ (e.g., top-left corner of the bounding box for the current sampled region). When the adaptive sampling module (1120) detects that the current sampled region overlapped with an already placed sampled region, the adaptive sampling module (1120) can determine a new position to place the current sampled region to avoid overlapping with previously placed sampled regions.

In some examples, a certain search window and/or criterial can be defined, and the adaptive sampling module (1120) can find a new position (denoted by $(u_n, v_n)$) for placing the current sampled region according to the certain search window and/or criterial. It is noted that, in some examples, an offset (also referred to as UV offset) between the new position $(u_n, v_n)$ and original position $(u_o, v_o)$ can be signaled from the encoder side to the decoder side for reconstruction.

In some embodiments, the sampled regions are placed not only to be non-overlapped, but also to have a certain amount of gap between regions. For example, each sampled region may be required to have a minimum 10-pixel distance to other sampled regions. It is noted that, the spacing between sampled regions can be defined by various techniques. In some examples, the minimum distance between sampled regions can be defined by a minimum horizontal distance $l_0$, and a minimum vertical distance $l_1$.

Some aspects of the disclosure also provide signaling techniques for the adaptive sampling for mesh compression.

In some embodiments, sampling rates of different regions of a mesh can be signaled in a bitstream that carries information of the mesh. It is noted that the sampling rates can be signaled at different levels in the bitstream. In an example, sampling rates can be signaled in a sequence header for an entire mesh sequence that includes a sequence of mesh frames. In another example, sampling rates can be signaled in a group header for a group of mesh frames (that is in similar concept as a group of pictures (GOP)). In another example, sampling rates can be signaled in the frame header for each mesh frame. In another example, a sampling rate of a slice in a mesh frame is signaled in a slice header of the slice. In another example, a sampling rate for a tile in a mesh frame is signaled in a tile header of the tile. In another example, a sampling rate for a patch in a mesh frame is signaled in a patch header of the patch.

Specifically, in some embodiments, a control flag can be signaled to indicate if the adaptive sampling method is applied or not at different levels in the bitstream. In an example, a control flag is signaled in a sequence header for an entire mesh sequence. In another example, a control flag is signaled in a group header for a group of mesh frames. In another example, a control flag is signaled in the frame header of each mesh frame. In another example, a control flag for a slice in a mesh frame is signaled in a slice header of the slice. In another example, a control flag for a tile in a mesh frame is signaled in a tile header of the tile. In another example, a control flag for a patch in a mesh frame is signaled in a patch header of the patch. When a control flag at a level is true, adaptive sampling is enabled at the level, such that adaptive sampling rates may be applied. When the control flag at a level is false, the adaptive sampling is disabled such that the uniform sampling rate will be applied at the level.

In some examples, the control flag includes 1 bit, and can be coded by various techniques. In an example, the control flag is coded by entropy coding (e.g., arithmetic coding and Huffman coding) with fixed or updated probability. In another example, the control flag is coded by a coding technique with less complexity (referred to as bypass coding).

In some examples, a base sampling rate can be signaled regardless of whether the adaptive sampling is enabled or not. When the adaptive sampling is enabled, the base sampling rate can be used as a predictor, and each region can signal the difference from the base sampling rate to indicate the actual sampling rate of the region. When the adaptive sampling is disabled, the base sampling rate can be used as the uniform sampling rate in the entire content of the suitable level.

The base sampling rate can be signaled at different levels in the bitstream as well. In an example, a base sampling rate can be signaled in a sequence header for an entire mesh sequence. In another example, a base sampling rate can be signaled in a group header for a group of mesh frames. In another example, a base sampling rate can be signaled in the frame header for each mesh frame. In another example, a base sampling rate of a slice in a mesh frame is signaled in a slice header of the slice. In another example, a base sampling rate for a tile in a mesh frame is signaled in a tile header of the tile. In another example, a base sampling rate for a patch in a mesh frame is signaled in a patch header of the patch.

In some examples, the base sampling rate can be binarized by fixed-length or variable-length representation (e.g., fixed k-bit representation and k-ordered Exp-Golomb representation), and each bit can be either coded by entropy coding (e.g., arithmetic coding and Huffman coding) with fixed or updated probability or can be coded by bypass coding with less complexity.

According to an aspect of the disclosure, when the adaptive sampling is enabled, sampling rates of regions in a mesh frame are suitably signaled. In some examples, the number of regions in an entire mesh frame can be signaled or can be derived (e.g., as the number of CTU rows, the number of tiles, the number of patches, and the like).

According to an aspect of the disclosure, the sampling rates of regions can be signaled without prediction. In an example, the sampling rate of each region (or the entire 2D atlas) can be signaled directly without any prediction. In another example, the sampling rate for each region (or the entire 2D atlas) can be chosen from a pre-established set of sampling rates that are known by both the encoder and decoder. The signaling of a particular sampling rate can be performed by signaling the index of the particular sampling rate in the pre-established rate set. For example, a pre-established set of sampling steps can include (every 2 pixels, every 4 pixels, every 8 pixels, etc.). Index 1 can be signaled to indicate the sampling rate of every 2 pixels (e.g., 2:1); index 2 can be signaled to indicate the sampling rate of every 4 pixels (e.g., 4:1); index 3 can be signaled to indicate the sampling rate of every 8 pixels (e.g., 8:1).

According to another aspect of the disclosure, the sampling rates of regions can be predicted. It is noted that any suitable prediction technique can be used.

In an example, the sampling rate for each region (or the entire 2D atlas) of a mesh frame can be predicted from a pre-established rate set. In another example, the sampling rate for each region (or the entire 2D atlas) of a mesh frame can be predicted from a previously used sampling rate in other already coded regions of the same frame. In another example, the sampling rate for each region (or the entire 2D atlas) of a mesh frame can be predicted from a previously used sampling rate in other already coded mesh frames.

According to another aspect of the disclosure, the sampling rate of each region (or the entire 2D atlas) can be determined in a way that both prediction and directly signaling are allowed. In an example, a syntax can be structured to indicate whether a sampling rate will be predicted or directly signaled. When the syntax indicates that the sampling rate is predicted, which predictor to use for predicting the sampling rate is further signaled for example by another syntax. When the syntax indicates that the sampling rate is directly signaled, the value of the sampling rate is signaled for example by another syntax.

In some examples, when the sampling rate is signaled directly (by signaling the sampling rate or signaling the index pointing to the sampling rate), the sampling rate or the index pointing to the sampling rate can be binarized by fixed-length or variable-length representation (e.g., fixed k-bit representation and k-ordered Exp-Golomb representation), and each bit can be either coded by entropy coding (e.g., arithmetic coding and Huffman coding) with fixed or updated probability, or by bypass coding with less complexity.

In some examples, when the sampling rate is signaled by prediction, a prediction residual can be signaled. The prediction residual can be binarized by fixed-length or variable-length representation (e.g., fixed k-bit representation and k-ordered Exp-Golomb representation), and each bit can be either coded by entropy coding (e.g., arithmetic coding and Huffman coding) with a fixed probability or updated probability or can be coded by bypass coding with a lower complexity. For example, the sign bit of the prediction residual can be coded by bypass coding and the absolute value of prediction residual can be coded by entropy coding with updated probability.

According to some aspects of the disclosure, when the adaptive sampling is enabled, the offset of UV coordinates (also referred to as UV offset), i.e., offset$_u$=u$_o$−u$_n$ and offset$_v$=v$_o$−v$_u$, of each region in a mesh frame can be coded in the bitstream that carries the mesh frame. In some examples, the number of regions in the entire mesh frame can be signaled or derived (e.g., as the number of CTU rows, the number of tiles, the number of patches, and the like).

According to an aspect of the disclosure, the UV offsets of regions can be signaled without prediction. In an example, the UV offset of each region can be signaled directly without any prediction.

According to another aspect of the disclosure, the UV offsets of regions can be predicted. It is noted that any suitable prediction technique can be used. In an example, the UV offset of each region is predicted from a pre-established UV offset set. In another example, the UV offset of each region is predicted from a previously used UV offset in other already coded regions of the same mesh frame. In another example, the UV offset of each region is predicted from a previously used UV offset in other already coded mesh frames.

According to another aspect of the disclosure, the UV offset of each region can be signaled in a way that both prediction and direct signaling are allowed. In some examples, a syntax can be structured to indicate whether a UV offset will be predicted or directly signaled. When the syntax indicates that the UV offset is predicted, which predictor to use for predicting the UV offset is further signaled by another syntax. When the syntax indicates that the UV offset is directly signaled, the value of the UV offset is signaled by another syntax.

In some examples, the UV offset is signaled directly, the value of the UV offset can be binarized by fixed-length or variable-length representation (e.g., fixed k-bit representation and k-ordered Exp-Golomb representation), and each bit can be coded by entropy coding (e.g., arithmetic coding and Huffman coding) with a fixed probability or updated probability or can be coded by bypass coding with less complexity. In an example, the sign bit of the UV offset can be coded by bypass coding and the absolute value of the UV offset can be coded by entropy coding with updated probability.

In some examples, the sign bit of the UV offset can be inferred or predicted from the value of sampling rate. For example, when the sampling rate of the region is larger than the base sampling rate, then the sign bit of the UV offset can be inferred or predicted as positive; and when the sampling rate of the region is smaller than the base sampling rate, then the sign bit of the UV offset can be inferred or predicted as negative. If the sampling rate of the region equals to the base sampling rate, then the UV offset can be inferred or predicted as zeros.

In some examples, the UV offset can be predicted, the prediction residual can be signaled. For example, the prediction residual be binarized by fixed-length or variable-length representation (e.g., fixed k-bit representation and k-ordered Exp-Golomb representation), and each bit can be coded by entropy coding (e.g., arithmetic coding and Huffman coding) with a fixed probability or updated probability or can be coded by bypass coding with less complexity. In an example, the sign bit of the prediction residual can be coded by bypass coding and the absolute value of prediction residual can be coded by entropy coding with updated probability.

Some aspects of the disclosure also provide mesh reconstruction techniques for use at the decoder side. The mesh reconstruction techniques can be used in a mesh reconstruction module, such as the mesh reconstruction module (1190).

In some examples, the decoded maps (1165) include a decoded occupancy map, and the mesh reconstruction module (1190) can reconstruct the mesh frame according to the decoded maps (1165) that include the decoded occupancy map, a decoded geometry map and one or more decoded attribute maps. It is noted that, in some examples, the decoded occupancy map corresponds to a sampled occupancy map that can be result of adaptive sampling using same sampling rates as the decoded geometry map and the decoded attribute maps, thus the decoded occupancy map includes sampled regions.

In some examples, the decoded maps (1165) do not include occupancy map, the bitstream (1145) includes information that identifies boundary vertices of each region, for example, as auxiliary data encoded by the auxiliary data encoder (1140). The auxiliary data decoder (1170) can decode the information that identifies the boundary vertices of the regions. The mesh reconstruction module (1190) can infer regions for an inferred occupancy map based on the boundary vertices of the regions. It is noted that, in some examples, the inferred occupancy map has not been processed with the adaptive sampling. The mesh reconstruction module (1190) can reconstruct the mesh frame according to the inferred occupancy map and the decoded maps (1165) that include a decoded geometry map and one or more decoded attribute maps.

According to an aspect of the disclosure, the mesh reconstruction module (1190) can determine UV coordinates for vertices in the mesh frame and determine 3D coordinates and attribute values of the vertices in the mesh frame based on the decoded maps (1165) and the decoded auxiliary data (e.g., sampling rates, UV offsets, information identifying boundary vertices, and the like).

In some embodiments, to determine the UV coordinates of vertices in a region, the sampling rate (SR) of the region is determined according to syntax values decoded from the bitstream (1145). In some examples, the UV offset, such as (offset$_u$, offset$_v$) of the region is determined according to syntax values decoded from the bitstream (1145).

In an example, the decoded maps (1165) include the decoded occupancy map. The mesh reconstruction module (1190) can determine UV coordinates of vertices corresponding to each occupied point in a sampled region of the decoded occupancy map. For example, for each occupied point with coordinates ($u_i$, $v_i$) in the sampled region, the mesh reconstruction module (1190) can determine the UV coordinates ($U_i$, $V_i$) of a vertex corresponding to the occupied point according to Eq. (4) and Eq. (5):

$$U_i=(u_i+\text{offset}_u)\times SR \qquad \text{Eq. (4)}$$

$$V_i=(v_i+\text{offset}_v)\times SR \qquad \text{Eq. (5)}$$

In another example, the decoded maps (1165) do not include the decoded occupancy map. The mesh reconstruction module (1190) can determine an inferred region in the inferred occupancy map according to the boundary vertices of the region. The UV coordinates of vertices corresponding to the occupied points in the inferred region can be directly inferred by the positions of the occupied points in region of the inferred occupancy map. For example, an occupied point in the inferred occupancy map has a position defined by specific UV coordinates ($U_s$, $V_s$), the specific UV coordinates ($U_s$, $V_s$) are the UV coordinates of a corresponding vertex in the mesh frame.

In some embodiments, for each occupied point on an occupancy map (e.g., a decoded occupancy map, an inferred occupancy map), the mesh reconstruction module (1190) can recover a vertex on the mesh frame, and can determine corresponding geometry value (e.g., 3D coordinates) and attribute values according to the corresponding positions in the decoded geometry map and the decoded attribute maps.

In some embodiments, to derive the corresponding positions in the geometry and attribute maps for vertices in a region, the sampling rate (SR) of the region is determined according to syntax values decoded from the bitstream (1145). In some examples, the UV offset, such as (offset$_u$, offset$_v$) of the region is determined according to syntax values decoded from the bitstream (1145).

In an example, the decoded maps (1165) include the decoded occupancy map. For each occupied point with coordinates ($u_i$, $v_i$) in the sampled region of the decoded occupancy map, the corresponding position in the decoded geometry map and the decoded attribute maps can be directly derived from ($u_i$, $v_i$). For example, the sampling rates applied to an occupancy map to obtained the sampled occupancy map are consistent with the sampling rates applied to the geometry map (to obtained the sampled geometry map) and the attribute maps (to obtained the sampled attribute maps). The decoded occupancy map corresponds to the sampled occupancy map, the decoded geometry map corresponds to the sampled geometry map, and the decoded attribute maps correspond to the sampled attribute maps. Thus, an occupied point in the decoded occupancy map can have corresponding points with the same coordinates in the decoded geometry map and the decoded attribute maps.

In another example, the decoded maps (1165) do not include the decoded occupancy map. The mesh reconstruction module (1190) can determine an inferred region in the inferred occupancy map according to the boundary vertices of the region. For each occupied point with coordinates ($U_i$, $V_i$) in the inferred region, the corresponding position in the geometry map and the attribute maps can be derived Eq. (6) and Eq. (7):

$$u_i = \text{round}\left(\frac{U_i}{SR}\right) - \text{offset}_u \qquad \text{Eq. (6)}$$

$$v_i = \text{round}\left(\frac{V_i}{SR}\right) - \text{offset}_v \qquad \text{Eq. (7)}$$

In some embodiments, the mesh reconstruction module (1190) can infer the connectivity information among the vertices by inferring from occupied positions. In some embodiments, connectivity information can be explicitly signaled in the bitstream (1145).

Figure 14:
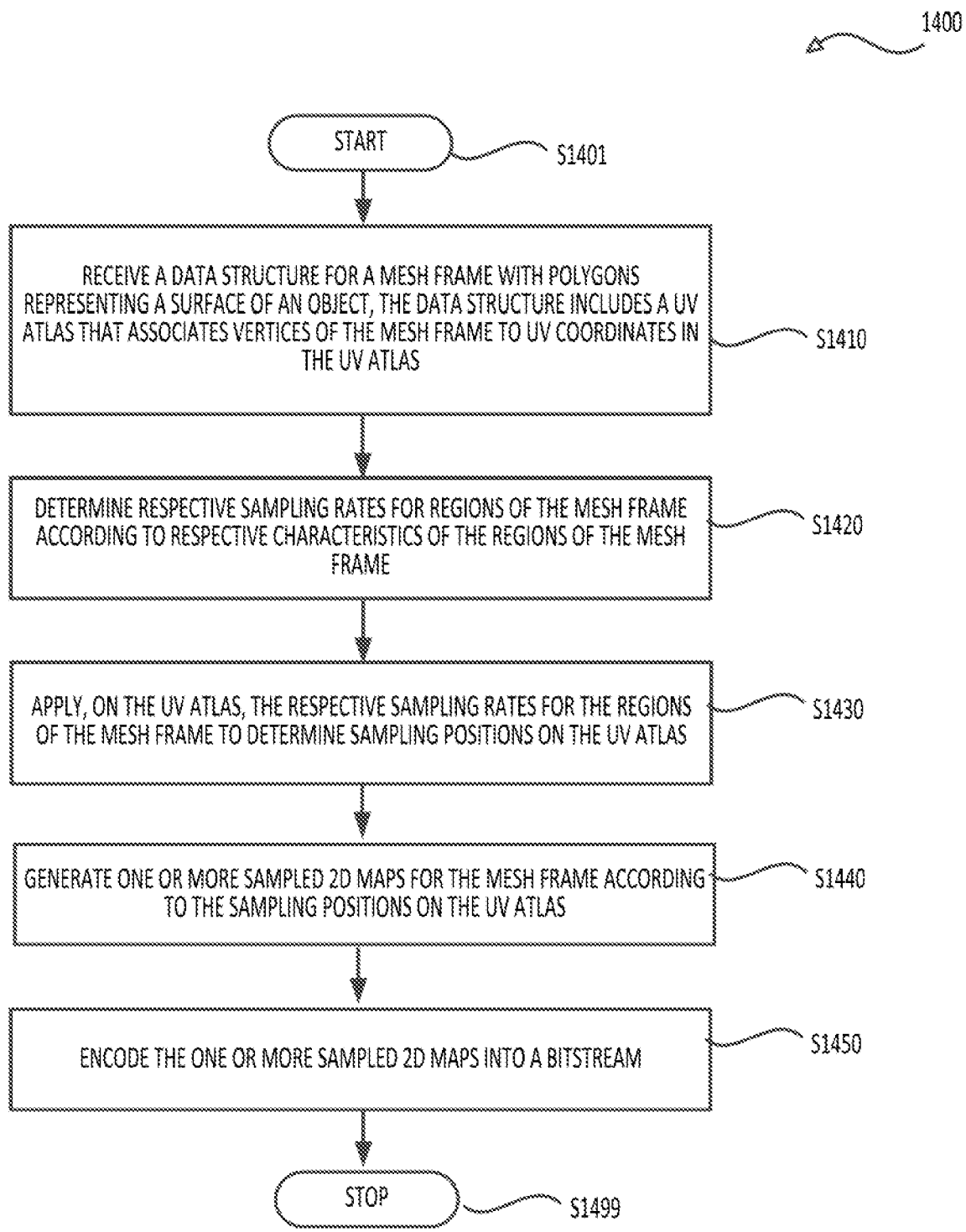
FIG. 14 shows a flow chart outlining a process example in some examples.

FIG. 14 shows a flow chart outlining a process (1400) according to an embodiment of the disclosure. The process (1400) can be used during an encoding process for a mesh. In various embodiments, the process (1400) is executed by processing circuitry. In some embodiments, the process (1400) is implemented in software instructions, thus when the processing circuitry executes the software instructions, the processing circuitry performs the process (1400). The process starts at (S1401) and proceeds to (S1410).

At (S1410), a data structure for a mesh frame with polygons representing a surface of an object is received. The data structure for the mesh frame includes a UV atlas that associates vertices of the mesh frame to UV coordinates in the UV atlas.

At (S1420), respective sampling rates for regions of the mesh frame are determined according to respective characteristics of the regions of the mesh frame.

At (S1430), the respective sampling rates for the regions of the mesh frame are applied on the UV atlas to determine sampling positions on the UV atlas.

At (S1440), one or more sampled two dimensional (2D) maps for the mesh frame are generated according to the sampling positions on the UV atlas.

At (S1450), the one or more sampled 2D maps are encoded into a bitstream.

To determine the respective sampling rates for the regions of the mesh frame, in some examples, a first sampling rate for a first region of the mesh frame is determined according to a requirement that limits a first number of sampling positions in the first region. In an example, the first sampling rate is determined to achieve an oversampling ratio (OR) that is closest to a target value. The OR is a ratio between the first number of sampling positions to a number of vertices originally in the first region of the mesh frame.

In another example, the first sampling rate is initialized to be relatively small, and is adjusted until an oversampling ratio (OR) is smaller than a first threshold. The OR is a ratio between the first number of sampling positions to a number of vertices originally in the first region of the mesh frame.

In another example, the first sampling rate is adjusted until an oversampling ratio (OR) is smaller than a first threshold and larger than a second threshold. The OR is a ratio between the first number of sampling positions to a number of vertices originally in the first region of the mesh frame.

In some examples, a sampled 2D map of the one or more sampled 2D map includes sampled regions with sampled points corresponding to the sampling positions on the UV atlas. In an example, when a sampling position is in a polygon, the sampling position is determined to be occupied. Then, an attribute of a sampled point in the sampled 2D map corresponding to the sampling position is determined according to attributes of vertices of the polygon.

In some examples, to form the one or more sampled 2D maps, sampled regions corresponding to the regions of the mesh can be determined based on the respective sampling rates of the regions of the mesh. Then, the sampling regions are placed in a non-overlapping configuration to form a sampled map. In an example, the sampled regions are place one by one. In an example, a bounding box of a sampled region is determined, and the sampled region is placed to avoid one or more corners of the bounding box to overlap with other already placed sampled regions.

For example, to place the sampling regions in the non-overlapping configuration, after a subset of the sampled regions are placed in the non-overlapping configuration, for a current sampled region, an initial placement position is determined according to a sampling rate of the current sampled region. Then, whether the current sampled region at the initial placement position will overlap with the subset of the sampled regions is determined.

In some examples, an offset to the initial placement position is determined in response to the current sampled region at the initial placement position overlapping with the subset of the sampled regions. The offset allows the current sampled region to be non-overlapped with the subset of the sampled regions.

In some examples, the non-overlapping configuration includes a minimum distance requirement between the sampled regions.

In some embodiments, the sampling rates respectively associated with regions are encoded by various techniques. In an example, a value of a first sampling rate for a first region is encoded directly into the bitstream. In another example, a first index is encoded into the bitstream, and the first index indicates a selection of the first sampling rate from a set of sampling rates. In another example, a syntax indicating a predictor for predicting the first sampling rate from a pre-established set of sampling rates is encoded into the bitstream. In another example, a syntax indicating a predictor for predicting the first sampling rate from a previously used sampling rate for an encoded region of the mesh frame is encoded into the bitstream. In another example, a syntax indicating a predictor for predicting the first sampling rate from a previously used sampling rate for an encoded region in another mesh frame encoded prior to the mesh frame is encoded into the bitstream.

In some embodiments, the encoder side can make a decision to signal a first sampling rate associated with a first region or to predict the first sampling rate, and encode a first syntax value indicating the decision into the bitstream. In an example, in response to the decision being signaling the first sampling rate, a value of the first sampling rate is encoded directly into the bitstream. In another example, in response to the decision being signaling the first sampling rate, an index is encoded into the bitstream, the index indicates a selection of the first sampling rate from a set of sampling rates.

In some examples, in response to the decision being predicting the first sampling rate, a second syntax is encoded into the bitstream. The second syntax indicates a predictor to use for predicting the first sampling rate. Further, in an example, a prediction residual is encoded into the bitstream. The prediction residual is a difference between the first sampling rate and a sampling rate of the predictor.

In some examples, a base sampling rate is encoded into the bitstream. The base sampling rate can be encoded at any suitable level, and regardless of whether adaptive sampling is used. The base sampling rate can be used as a predictor in an example.

In some examples, a control flag is encoded to indicate when an application of an adaptive 2D atlas sampling on the mesh frame is used.

In some examples, a first UV offset associated with a first region of the mesh frame is determined. The first UV offset is applied to a first sampled region corresponding to the first region to avoid overlapping with other sampled regions. One or more syntax can be encoded into the bitstream, the one or more syntax can indicate the first UV offset. In an example, a syntax having a value of the first UV offset is directly encoded into the bitstream. In another example, a syntax indicating a predictor for predicting the first UV offset based on a pre-established set of UV offsets is encoded into the bitstream. In another example, a syntax indicating a predictor for predicting the first UV offset based on a previously used UV offset for an encoded region of the mesh frame is encoded into the bitstream. In another example, a syntax indicting a predictor for predicting the first UV offset based on a previously used UV offset for an encoded region in another mesh frame encoded prior to the mesh frame is encoded into the bitstream.

In some examples, a syntax indicating a predictor for predicting the first UV offset into the bitstream is encoded into the bitstream and a prediction residual is encoded into the bitstream, the prediction residual is a difference between the first UV offset and an UV offset of the predictor.

Then, the process proceeds to (S1499) and terminates.

The process (1400) can be suitably adapted. Step(s) in the process (1400) can be modified and/or omitted. Additional step(s) can be added. Any suitable order of implementation can be used.

Figure 15:
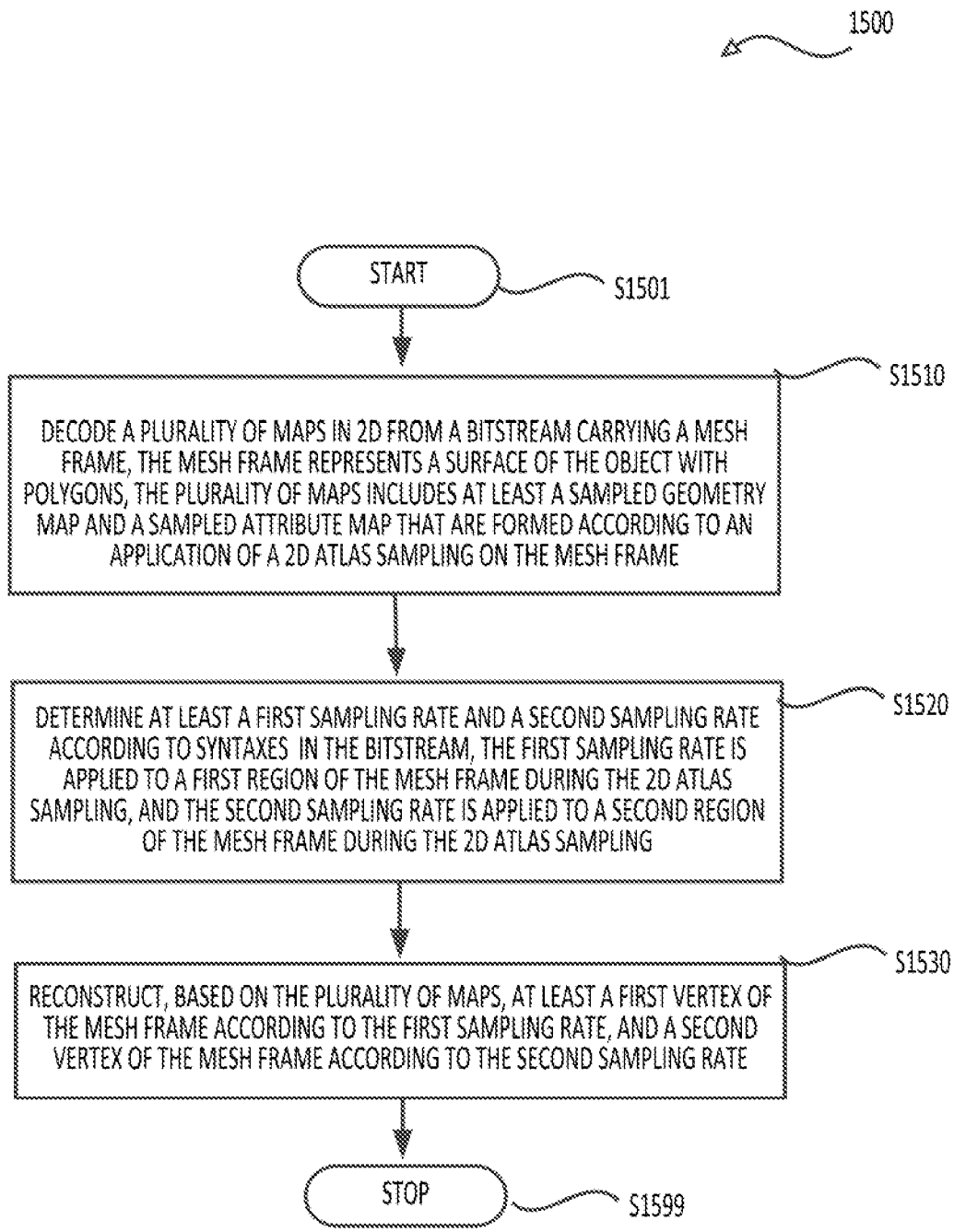
FIG. 15 shows a flow chart outlining a process example in some examples.

FIG. 15 shows a flow chart outlining a process (1500) according to an embodiment of the disclosure. The process (1500) can be used during a decoding process for a mesh. In various embodiments, the process (1500) is executed by processing circuitry. In some embodiments, the process (1500) is implemented in software instructions, thus when the processing circuitry executes the software instructions, the processing circuitry performs the process (1500). The process starts at (S1501) and proceeds to (S1510).

At (S1510), a plurality of maps in 2D is decoded from a bitstream carrying a mesh frame. The mesh frame represents a surface of an object with polygons, the plurality of maps in 2D includes at least a decoded geometry map and a decoded attribute map with an adaptive 2D atlas sampling being applied.

At (S1520), at least a first sampling rate and a second sampling rate are determined according to syntaxes in the bitstream. The first sampling rate is applied to a first region of the mesh frame during the adaptive 2D atlas sampling, and the second sampling rate is applied to a second region of the mesh frame during the adaptive 2D atlas sampling. The first sampling rate is different from the second sampling rate.

At (S1530), based on the plurality of maps, at least a first vertex of the mesh frame is reconstructed according to the first sampling rate, and a second vertex of the mesh frame is reconstructed according to the second sampling rate.

In some examples, the plurality of maps includes a decoded occupancy map with the adaptive 2D atlas sampling being applied. To reconstruct at least the first vertex according to the first sampling rate, initial UV coordinates of an occupied point in a first sampled region of the decoded occupancy map corresponding to the first region of the mesh frame are determined, the occupied point corresponding to the first vertex. Then, recovered UV coordinates for the first vertex are determined based on the initial UV coordinates and the first sampling rate. In an example, a first UV offset of the first sampled region is determined according to syntaxes from the bitstream. The recovered UV coordinates of the first vertex are determined based on the initial UV coordinates, the first sampling rate and the first UV offset. Further, in an example, recovered 3D coordinates for the first vertex are determined according to a pixel in the decoded geometry map at the initial UV coordinates, and a recovered attribute value for the first vertex is determined according to a pixel in the decoded attribute map at the initial UV coordinates.

In some embodiments, the plurality of maps lacks an occupancy map. To reconstruct at least the first vertex according to the first sampling rate, information that indicates first boundary vertices for the first region is decoded from the bitstream. A first occupied region in an occupancy map corresponding to the first region is inferred according to the first boundary vertices. UV coordinates of an occupied point in the first occupied region is obtained, the occupied point can correspond to the first vertex. The UV coordinates are converted to sampled UV coordinates according to at least the first sampling rate. Based on the plurality of maps, the first vertex is reconstructed according to the sampled UV coordinates.

In some examples, to reconstruct the first vertex, recovered 3D coordinates for the first vertex are determined according to a pixel in the decoded geometry map at the sampled UV coordinates, and a recovered attribute value for the first vertex is determined according to a pixel in the decoded attribute map at the sampled UV coordinates.

In some examples, to convert the UV coordinates to the sampled UV coordinates, a first UV offset associated with the first region is decoded from the bitstream, and the UV coordinates are converted to the sampled UV coordinates according to the first sampling rate and the first UV offset.

In some embodiments, the at least the first sampling rate and the second sampling rate can be determined by various techniques. In an example, values of the at least the first sampling rate and the second sampling rate are directly decoded from the bitstream. In another example, at least a first index and a second index are decoded from the bitstream, the first index indicates a selection of the first sampling rate from a set of sampling rates, and the second index indicates a selection of the second sampling rate from the set of sampling rates. In another example, the first sampling rate is predicted based on a pre-established set of rates. In another example, the first sampling rate is predicted based on a previously used sampling rate for a decoded region of the mesh frame. In another example, the first sampling rate is predicted based on a previously used sampling rate for a decoded region in another mesh frame decoded prior to the mesh frame.

In some embodiments, to determine the first sampling rate, a first syntax value indicating whether the first sampling rate is signaled or predicted is decoded from the bitstream. In an example, in response to the first syntax value indicating that the first sampling rate is signaled, a value of the first sampling rate is decoded directly from the bitstream. In another example, in response to the first syntax value indicating that the first sampling rate is signaled, an index is decoded from the bitstream. The index indicates a selection of the first sampling rate from a set of sampling rates.

In some examples, in response to the first syntax value indicating that the first sampling rate is predicted, a second syntax is decoded from the bitstream, the second syntax indicates a predictor to use for predicting the first sampling rate. Further, in an example, a prediction residual is determined based on syntax values decoded from the bitstream; and the first sampling rate is determined based on the predictor and the prediction residual.

In some examples, a base sampling rate is decoded from the bitstream, and the at least the first sampling rate and the second sampling rate can be determined according to the base sampling rate. For example, the base sampling rate is used as a predictor.

In some examples, a control flag that indicates an application of an adaptive 2D atlas sampling on the mesh frame is decoded from the bitstream. Then, a number of regions in the mesh frame and sampling rates respectively for the regions are determined for example based on syntaxes in the bitstream.

In some examples, a first UV offset associated with the first region is determined from the bitstream, and based on the plurality of maps, the first vertex of the mesh frame is reconstructed according to the first sampling rate and the first UV offset. In an example, to determine the first UV offset associated with the first region, a value of the first UV offset is decoded directly from the bitstream. In another example, the first UV offset is predicted based on a pre-established set of UV offsets. In another example, the first UV offset is predicted based on a previously used UV offset for a decoded region of the mesh frame. In another example, the first UV offset is predicted based on a previously used UV offset for a decoded region in another mesh frame decoded prior to the mesh frame.

In some embodiments, to determine the first UV offset associated with the first region, a first syntax value indicating whether the first UV offset is signaled or predicted is decoded from the bitstream. In an example, in response to the first syntax value indicating that the first UV offset is signaled, a value of the first UV offset is decoded directly from the bitstream. In an example, a sign of the first UV offset is inferred based on a comparison of the first sampling rate with a base sampling rate.

In another example, in response to the first syntax value indicating that the first UV offset is predicted, a second syntax is decoded from the bitstream, the second syntax indicates a predictor to use for predicting the first UV offset. Further, a prediction residual is determined based on syntax values decoded from the bitstream, and the first UV offset is determined based on the predictor and the prediction residual.

Then, the process proceeds to (S1599) and terminates.

The process (1500) can be suitably adapted. Step(s) in the process (1500) can be modified and/or omitted. Additional step(s) can be added. Any suitable order of implementation can be used.

The techniques disclosed in the present disclosure may be used separately or combined in any order. Further, each of the techniques (e.g., methods, embodiments), encoder, and decoder may be implemented by processing circuitry (e.g., one or more processors or one or more integrated circuits). In some examples, the one or more processors execute a program that is stored in a non-transitory computer-readable medium.

The techniques described above, can be implemented as computer software using computer-readable instructions and physically stored in one or more computer-readable media. For example, FIG. 16 shows a computer system (1600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
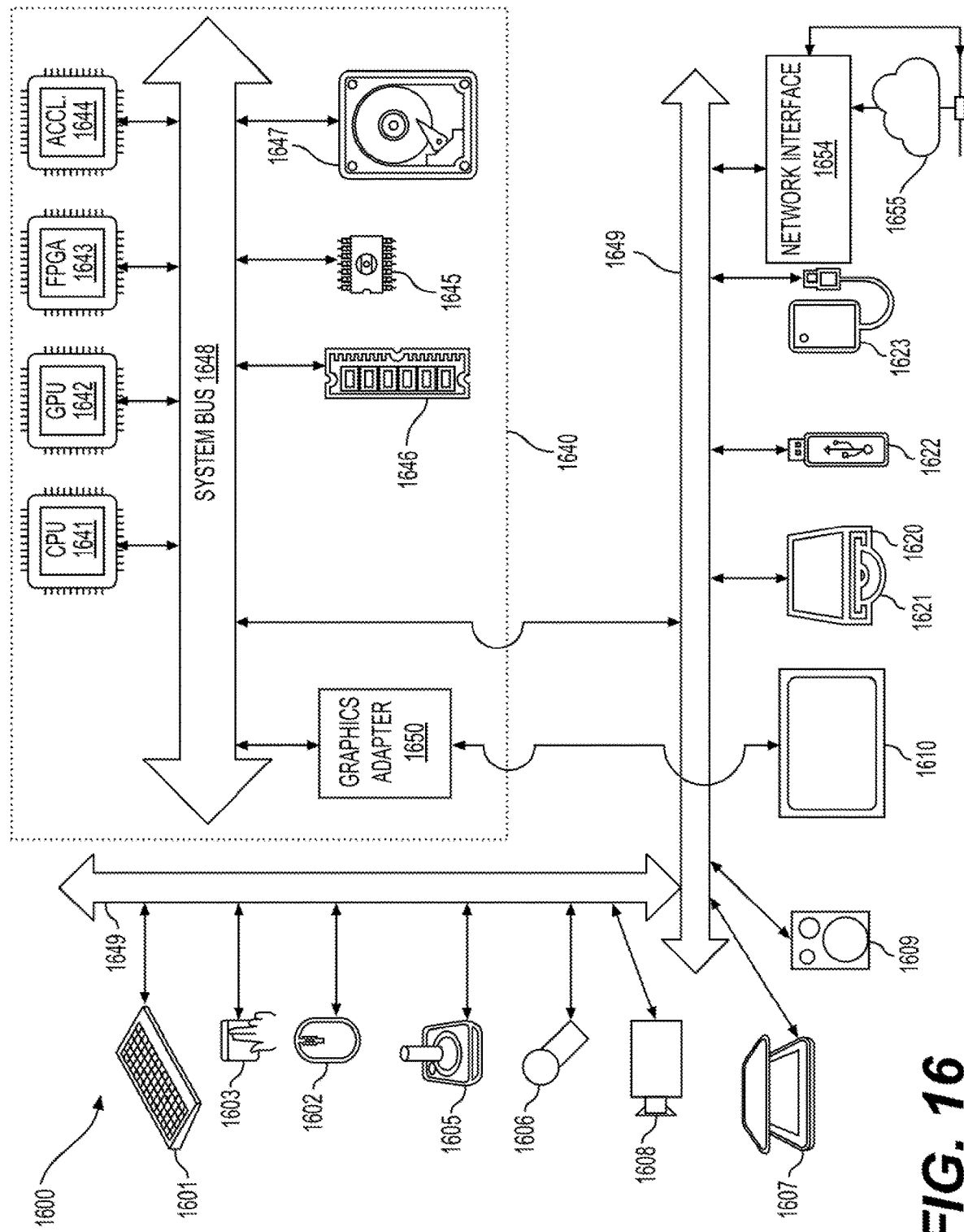
FIG. 16 is a schematic illustration of a computer system in some examples.

The components shown in FIG. 16 for computer system (1600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface (1654) to one or more communication networks (1655). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), graphics adapters (1650), and so forth. These devices, along with Read-only memory (ROM) (1645), Random-access memory (1646), internal mass storage such as internal non-user accessible hard drives, SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). In an example, the screen (1610) can be connected to the graphics adapter (1650). Architectures for a peripheral bus include PCI, USB, and the like.

CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can be also stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various embodiments of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hardwired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for encoding mesh compression, comprising:
   receiving a data structure for a mesh frame with polygons representing a surface of an object, the data structure for the mesh frame comprising a UV atlas that associates vertices of the mesh frame to UV coordinates in the UV atlas;
   determining respective sampling rates for regions of the mesh frame according to respective characteristics of the regions of the mesh frame;
   applying, on the UV atlas, the respective sampling rates for the regions of the mesh frame to determine sampling positions on the UV atlas;
   generating one or more sampled two dimensional (2D) maps for the mesh frame according to the sampling positions on the UV atlas;
   making a decision to signal a first sampling rate associated with a first region or to predict the first sampling rate; and
   when the decision is to predict the first sampling rate,
      encoding a first syntax, a second syntax, and the one or more sampled 2D maps into a bitstream, the first syntax indicating the decision and the second syntax indicating a predictor to use for predicting the first sampling rate.

2. The method of claim 1, wherein the determining the respective sampling rates for the regions of the mesh frame comprises:
   determining the first sampling rate for the first region of the mesh frame according to a requirement that limits a first number of sampling positions in the first region.

3. The method of claim 2, wherein the determining the first sampling rate for the first region of the mesh frame comprises:
   determining the first sampling rate to achieve an oversampling ratio (OR) that is closest to a target value, the OR being a ratio between the first number of sampling positions to a number of vertices originally in the first region of the mesh frame.

4. The method of claim 2, wherein the determining the first sampling rate for the first region of the mesh frame comprises:
   adjusting the first sampling rate until an oversampling ratio (OR) is smaller than a first threshold, the OR being a ratio between the first number of sampling positions to a number of vertices originally in the first region of the mesh frame.

5. The method of claim 2, wherein the determining the first sampling rate for the first region of the mesh frame comprises:
   adjusting the first sampling rate until an oversampling ratio (OR) is smaller than a first threshold and larger than a second threshold, the OR being a ratio between the first number of sampling positions to a number of vertices originally in the first region of the mesh frame.

6. The method of claim 1, wherein a sampled 2D map of the one or more sampled 2D map comprises sampled regions with sampled points corresponding to the sampling positions on the UV atlas, and the method further comprises:
   determining that a sampling position is occupied when the sampling position is in a polygon; and
   determining an attribute of a sampled point in the sampled 2D map corresponding to the sampling position according to attributes of vertices of the polygon.

7. The method of claim 1, wherein the generating the one or more sampled 2D maps further comprises:
   forming sampled regions corresponding to the regions of the mesh based on the respective sampling rates of the regions of the mesh; and
   placing the sampling regions in a non-overlapping configuration to form a sampled map.

8. The method of claim 7, wherein the placing the sampling regions in the non-overlapping configuration further comprises:
   after a subset of the sampled regions are placed in the non-overlapping configuration,
   determining, for a current sampled region, an initial placement position according to a sampling rate of the current sampled region; and
   determining, whether the current sampled region at the initial placement position overlaps with the subset of the sampled regions.

9. The method of claim 8, further comprising:
   determining an offset to the initial placement position when the current sampled region at the initial placement position overlaps with the subset of the sampled regions, the offset allowing the current sampled region to be non-overlapped with the subset of the sampled regions.

10. The method of claim 7, wherein the non-overlapping configuration comprises a minimum distance requirement between the sampled regions.

11. The method of claim 1, further comprising at least one of:
    encoding a value of the first sampling rate for the first region directly into the bitstream;
    encoding a first index into the bitstream, the first index indicating a selection of the first sampling rate from a set of sampling rates;
    encoding the second syntax indicating the predictor for predicting the first sampling rate from a pre-established set of sampling rates;
    encoding the second syntax indicating the predictor for predicting the first sampling rate from a previously used sampling rate for an encoded region of the mesh frame; and
    encoding the second syntax indicating the predictor for predicting the first sampling rate from a previously used sampling rate for an encoded region in another mesh frame encoded prior to the mesh frame.

12. The method of claim 1, wherein when the decision is to signal the first sampling rate, the method comprises at least one of:
    encoding a value of the first sampling rate directly into the bitstream; and encoding a third index into the bitstream, the third index indicating a selection of the first sampling rate from a set of sampling rates.

13. The method of claim 1, further comprising:
encoding a prediction residual into the bitstream, the prediction residual being a difference between the first sampling rate and a sampling rate of the predictor.

14. The method of claim 1, further comprising:
encoding a base sampling rate into the bitstream.

15. The method of claim 1, further comprising:
encoding a control flag that indicates an enable/disable of an adaptive 2D atlas sampling.

16. The method of claim 1, further comprising:
determining, at least a first UV offset associated with the first region of the mesh frame, the first UV offset being applied to a first sampled region corresponding to the first region to avoid overlapping with other sampled regions; and
encoding a third syntax indicating the first UV offset into the bitstream.

17. The method of claim 16, wherein the encoding the third syntax further comprises at least one of:
encoding the third syntax having a value of the first UV offset into the bitstream;
encoding the third syntax indicating a predictor for predicting the first UV offset based on a pre-established set of UV offsets;
encoding the third syntax indicating a predictor for predicting the first UV offset based on a previously used UV offset for an encoded region of the mesh frame; and
encoding the third syntax indicting a predictor for predicting the first UV offset based on a previously used UV offset for an encoded region in another mesh frame encoded prior to the mesh frame.

18. An apparatus for encoding mesh compression, comprising processing circuitry configured to:
receive a data structure for a mesh frame with polygons representing a surface of an object, the data structure for the mesh frame comprising a UV atlas that associates vertices of the mesh frame to UV coordinates in the UV atlas;
determine respective sampling rates for regions of the mesh frame according to respective characteristics of the regions of the mesh frame;
apply, on the UV atlas, the respective sampling rates for the regions of the mesh frame to determine sampling positions on the UV atlas;
generate one or more sampled two dimensional (2D) maps for the mesh frame according to the sampling positions on the UV atlas;
make a decision to signal a first sampling rate associated with a first region or to predict the first sampling rate; and
when the decision is to predict the first sampling rate,
encode a first syntax, a second syntax, and the one or more sampled 2D maps into a bitstream, the first syntax indicating the decision and the second syntax indicating a predictor to use for predicting the first sampling rate.

* * * * *